(12) United States Patent
Dria et al.

(10) Patent No.: US 7,896,069 B2
(45) Date of Patent: Mar. 1, 2011

(54) METHOD OF APPLYING A STRING OF INTERCONNECTED STRAIN SENSORS TO A CYLINDRICAL OBJECT

(75) Inventors: Dennis Edward Dria, Houston, TX (US); Frederick Henry Kreisler Rambow, Houston, TX (US); Michelle Yvonne Shuck, Houston, TX (US)

(73) Assignee: Shell Oil Company, Houston, TX (US)

( * ) Notice: Subject to any disclaimer, the term of this patent is extended or adjusted under 35 U.S.C. 154(b) by 722 days.

(21) Appl. No.: 11/836,001

(22) Filed: Aug. 8, 2007

(65) Prior Publication Data

US 2008/0047662 A1 Feb. 28, 2008

Related U.S. Application Data

(60) Provisional application No. 60/821,846, filed on Aug. 9, 2006.

(51) Int. Cl.
*E21B 47/00* (2006.01)
(52) U.S. Cl. ............... 166/250.01; 73/800; 73/862.046; 166/66; 166/227
(58) Field of Classification Search ............ 166/250.01, 166/66, 227; 73/772, 774, 800, 862.046, 73/862.624; 248/542, 543
See application file for complete search history.

(56) References Cited

U.S. PATENT DOCUMENTS

| | | | | |
|---|---|---|---|---|
| 4,654,520 A * | 3/1987 | Griffiths | ................. | 250/227.14 |
| 4,897,927 A * | 2/1990 | Nicol | ............................ | 33/534 |
| 4,930,852 A * | 6/1990 | Wheeler et al. | ............... | 359/315 |
| 5,250,802 A * | 10/1993 | Runner | .................... | 250/227.15 |
| 5,481,922 A | 1/1996 | Washabaugh | ................. | 73/774 |
| 5,845,033 A * | 12/1998 | Berthold et al. | ................ | 385/12 |
| 6,644,848 B1 * | 11/2003 | Clayton et al. | ................... | 374/7 |
| 7,194,913 B2 * | 3/2007 | Morrison et al. | ............... | 73/800 |
| 7,245,791 B2 * | 7/2007 | Rambow et al. | ................ | 385/12 |
| 7,461,561 B2 * | 12/2008 | Morrison et al. | ............... | 73/800 |
| 7,587,837 B2 * | 9/2009 | David et al. | ................. | 33/561.1 |
| 2005/0253051 A1 | 11/2005 | Hwang et al. | .................. | 241/43 |
| 2007/0289741 A1 * | 12/2007 | Rambow | ............... | 166/250.01 |
| 2008/0066334 A1 * | 3/2008 | David et al. | .................... | 33/755 |

\* cited by examiner

*Primary Examiner*—Hoang Dang

(57) ABSTRACT

A string of interconnected strain sensors applied to a cylindrical object for monitoring deformation of the object. The string of interconnected strain sensors is applied in a selected zig-zag pattern. A possibility is to drape a pliable support structure around the object, to which the the string of strain sensors has been mechanically coupled in the selected zig-zag pattern.

33 Claims, 21 Drawing Sheets

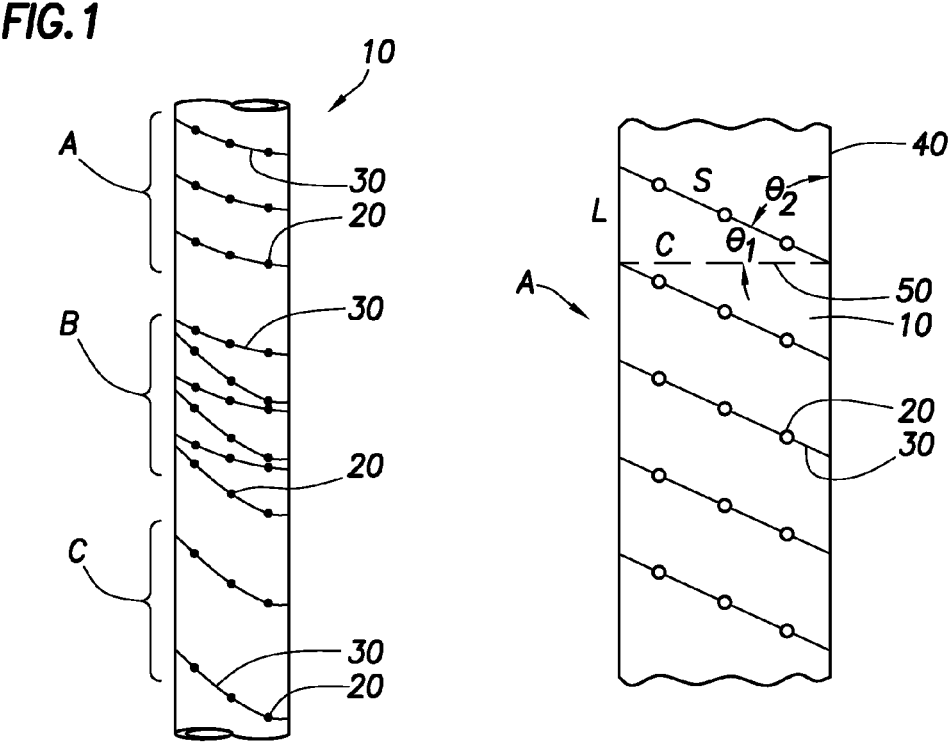
FIG. 1
FIG. 1A
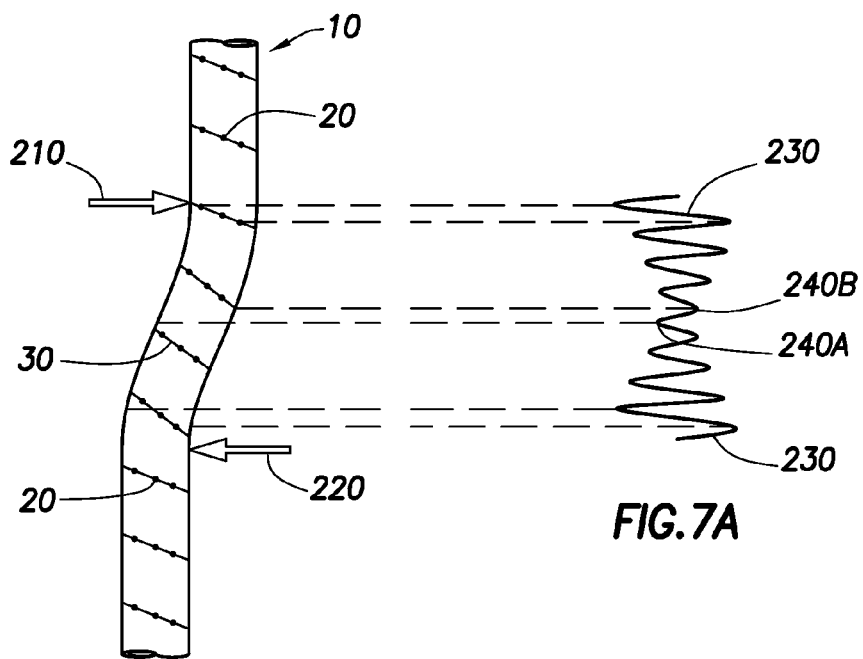
FIG. 7
FIG. 7A

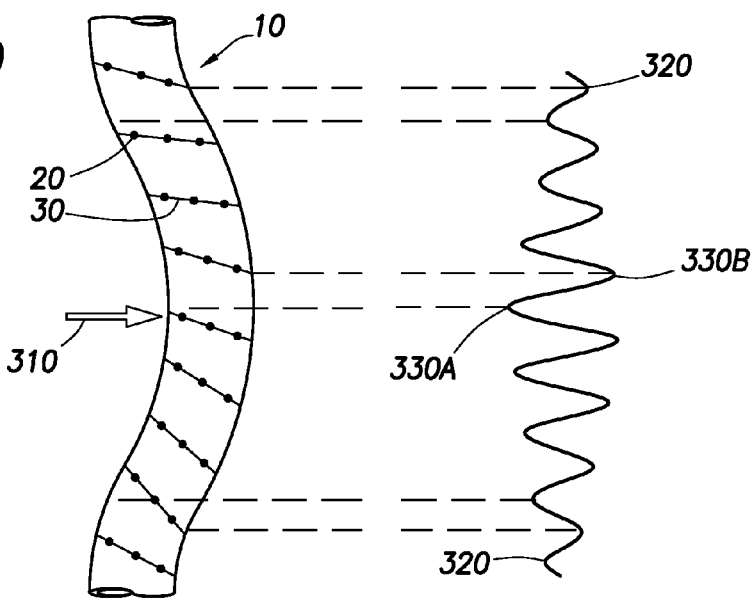
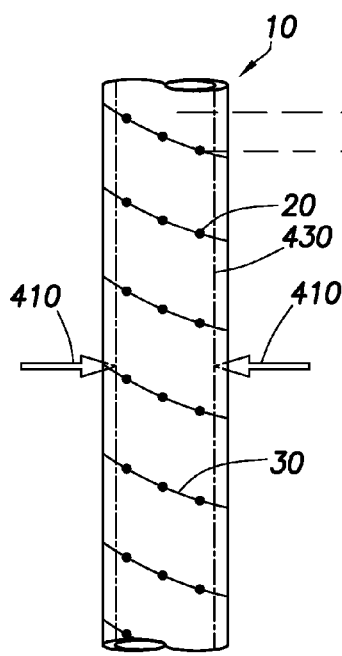
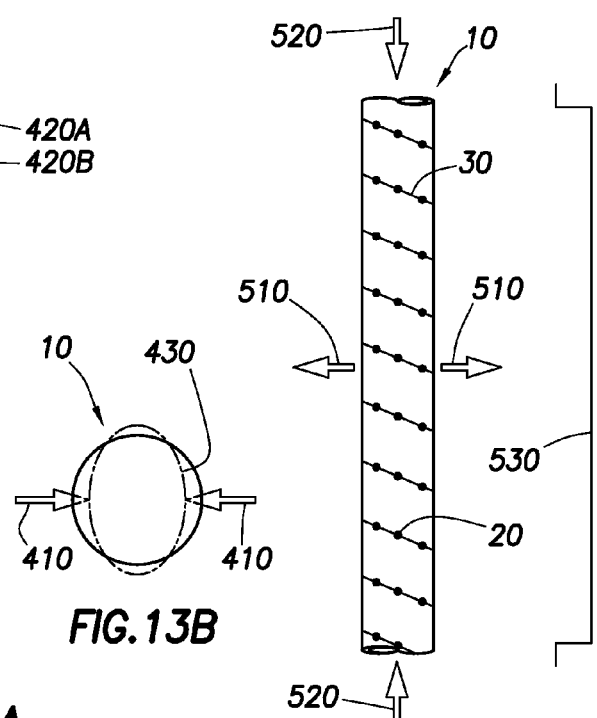
FIG.10  FIG.10A  FIG.13  FIG.13A  FIG.13B  FIG.22  FIG.22A

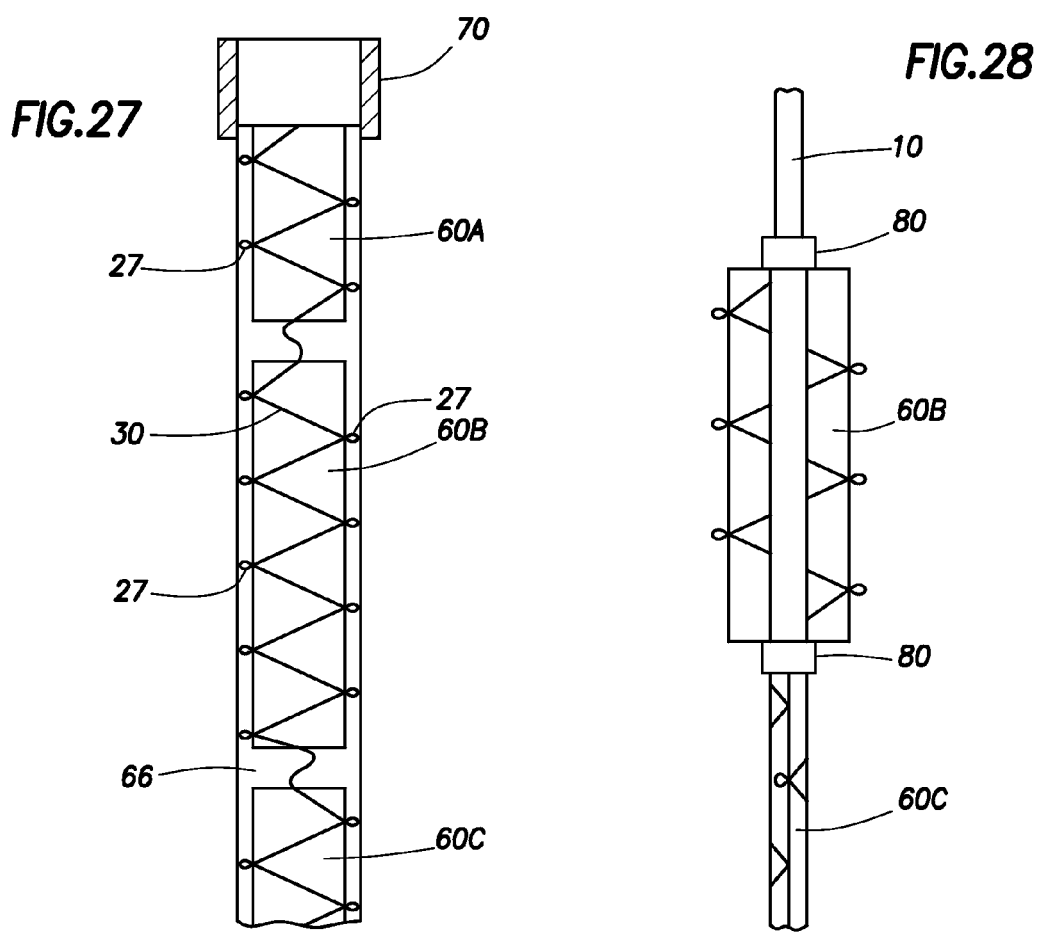
FIG.27
FIG.28
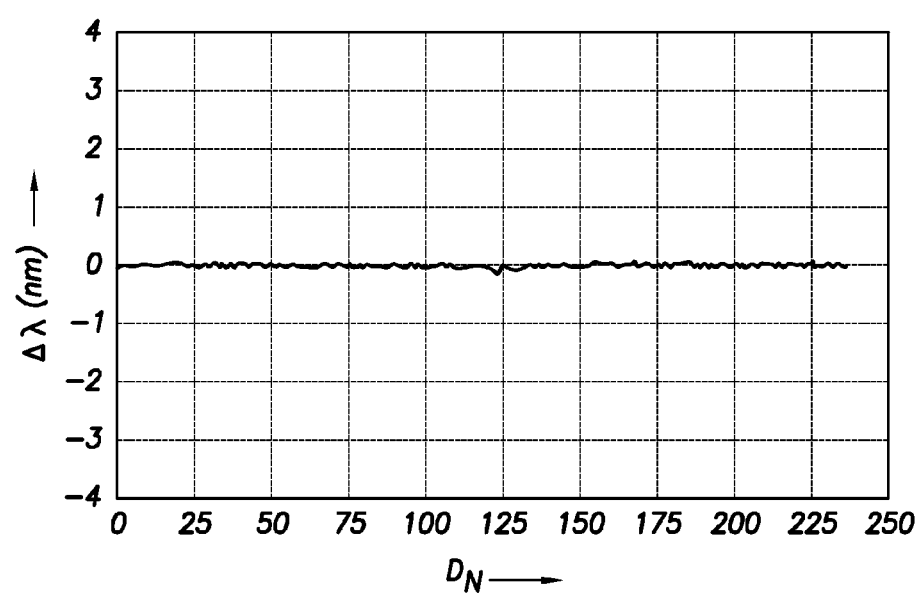
FIG.29

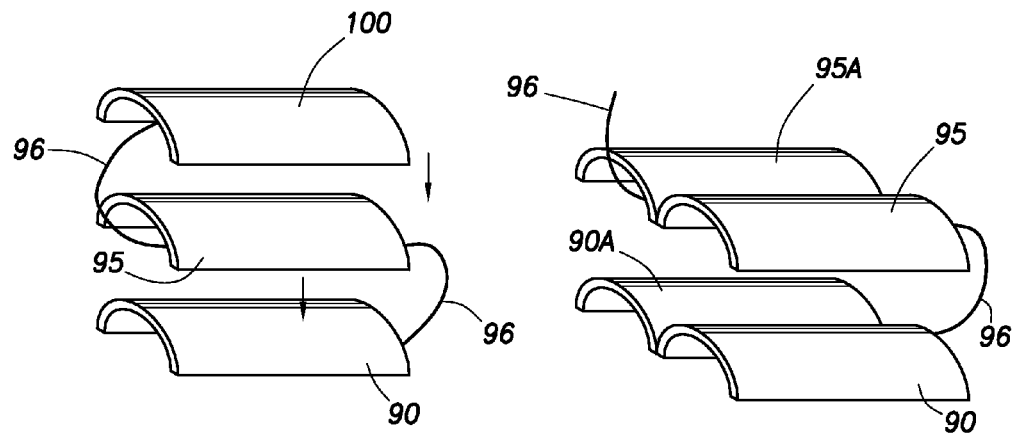
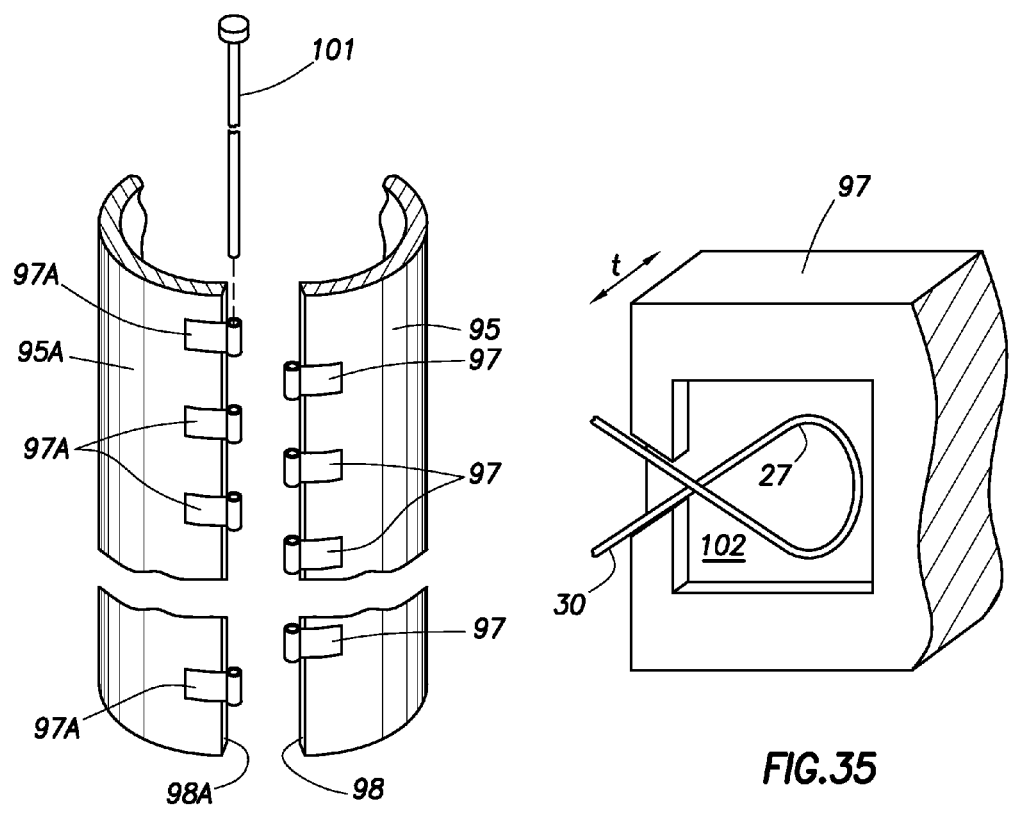
FIG.32  FIG.33
FIG.34  FIG.35

METHOD OF APPLYING A STRING OF INTERCONNECTED STRAIN SENSORS TO A CYLINDRICAL OBJECT

CROSS REFERENCE TO EARLIER APPLICATION

The present application claims benefit of U.S. Provisional application No. 60/821,846, filed 9 Aug. 2006.

FIELD OF THE INVENTION

In one aspect, the present invention relates to a method of applying a string of interconnected strain sensors to a cylindrical object.

In other aspects, the present invention relates to a pliable support structure and a cylindrical object having the pliable support structure draped around it.

In still another aspect, the present invention relates to a method of imaging deformation of an object.

BACKGROUND OF THE INVENTION

Wells in compactable sediments (or tectonically active areas) are subject to deformation over the productive life of the field. The result is the catastrophic loss of producing zones up to and including the loss of a whole well. The problem is exacerbated by the increasingly rapid off-take rates and the completion of multiple zones in a single well. The observable phenomenon is that at first a well casing will bend or begin to buckle, frequently at casing joints, or interfaces in the formation. As the compaction continues, the movement results in a significant misalignment of the well axis. The result can be the complete loss of the well investment resulting in deferred and/or lost production, if not the replacement cost of a well, which is extremely expensive. The ability to detect early bending would warn of a later buckle or collapse and allow for changes in production practices and/or remedial action. Detection of deformation forces, in-situ, can become a complex problem, particularly when such forces include axial, hoop and shear stresses.

U.S. Pat. No. 6,854,327, incorporated herein by reference, describes the use of bent, instead of stretched, FBG sensors that alter amplitude reflection and broaden frequency. The FBG sensors react to displacement forces with a predictable, altered, wavelength response that may be compared with a calibration curve to estimate shape and the magnitude of displacement. One embodiment is described as a helical-shaped optical fiber, wherein the FBG sensors are positioned in the bends of the optical fiber.

A need exists for an improved method of applying strain sensors to a cylindrical object for detecting and/or imaging and/or measuring deformations of the object.

SUMMARY OF THE INVENTION

The present invention meets the above needs and overcomes one or more deficiencies in the prior art. In a first aspect, the invention provides a method of applying a string of interconnected strain sensors to a cylindrical object for monitoring deformation of the object, comprising:

selecting a preferred first wrap angle range between 0 and 90°;

selecting a preferred second wrap angle range between 90° and 180°;

applying the string of interconnected strain sensors in a selected zig-zag pattern comprising first and second application lines, the first application line essentially following a curvature of the cylindrical object along a preferred first wrap angle within the preferred first wrap angle range, the second application line essentially following a curvature of the cylindrical object along a preferred second wrap angle within the preferred second wrap angle range, whereby a first portion of the strain sensors is applied along the first application line and a second portion of the strain sensors is applied along the second application line.

The string of strain sensors may be mechanically coupled to a pliable support structure in the selected zig-zag pattern, which pliable support structure may be draped around the object.

In a next aspect, the invention provides a pliable support structure to which a string of interconnected strain sensors is mechanically coupled in a selected zig-zag pattern, which pliable support structure is capable of being draped around a cylindrical object.

In a next aspect, the invention provides a cylindrical object having a pliable support structure draped around it, to which pliable support structure a string of interconnected strain sensors is mechanically coupled in a selected zig-zag pattern.

In a next aspect, the invention provides a method of imaging deformation of an object comprising the steps of:

selecting a preferred first wrap angle range between 0 and 90°;

selecting a preferred second wrap angle range between 90° and 180°;

applying a plurality of sensors in a selected zig-zag pattern comprising first and second application lines, the first application line essentially following a curvature of the cylindrical object along a preferred first wrap angle within the preferred first wrap angle range, the second application line essentially following a curvature of the cylindrical object along a preferred second wrap angle within the preferred second wrap angle range, whereby a first portion of the plurality of sensors is applied along the first application line and a second portion of the plurality of sensors is applied along the second application line;

detecting deformation of the object at each sensor; and imaging the deformation detected at each sensor on a projection device.

The invention will hereinafter be illustrated by way of examples and preferred embodiments, with reference to the attached drawing figures. Other objects, features and advantages of the present invention will be apparent to those skilled in the art from the following description of the various embodiments and related drawings.

BRIEF DESCRIPTION OF THE DRAWINGS

In the attached drawing figures:

FIG. 1 is an elevational view of a cylindrical object illustrating a plurality of sensors or transducers applied to the object along three different sections (A, B, C) of the object;

FIG. 1A is a linear perspective of section A in FIG. 1;

FIG. 7 is an elevational view of a cylindrical object illustrating shear forces on the object;

FIG. 7A is an image of a wavelength response illustrating the corresponding strain measured by the strain sensors in FIG. 7;

FIG. 10 is an elevational view of a cylindrical object illustrating bending forces on the object;

FIG. 10A is an image of a wavelength response illustrating the corresponding strain measured by the strain sensors in FIG. 10;

FIG. 13 is an elevational view of a cylindrical object illustrating crushing or ovalization forces on the object;

FIG. 13A is an image of a wavelength response illustrating the corresponding strain measured by the strain sensors in FIG. 13;

FIG. 13B is a top view of FIG. 13;

FIG. 22 is an elevational view of a cylindrical object illustrating compressional forces on the object;

FIG. 22A is an image of a wavelength response illustrating the corresponding strain measured by the strain sensors in FIG. 22;

FIG. 27 shows an elevated view of a series of pliable support structures on a spool;

FIG. 28 schematically shows an elevated view of applying the series of pliable support structures to a string of tubular objects;

FIG. 29 shows measured wavelength shift (Δλ) versus grating number ($D_N$) of a fiber draped around a vertically oriented polyurethane rod on a support member in the form of a sheet of paper;

FIG. 32 schematically shows a perspective view of how a plurality of clam shell parts can be stacked together;

FIG. 33 is a variation on FIG. 32 where couples of pivotably connected claim shell parts are stacked;

FIG. 34 shows a schematic perspective view of clam shell parts provided with a latching mechanism;

FIG. 35 shows a schematic detailed view of a specific embodiment of the brackets of the latching mechanism provided with a cavity for accommodating a free loop.

DETAILED DESCRIPTION OF THE PREFERRED EMBODIMENTS

Figure 2:
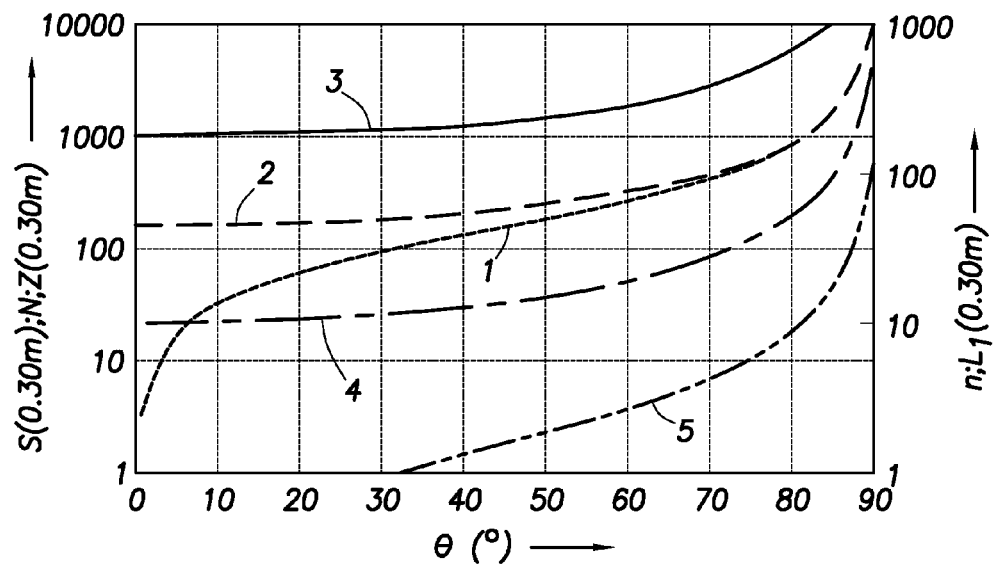
FIG. 2 is a graph of illustrating the determination of preferred number of strain sensors (N) and preferred number of wraps needed to cover a predetermined length.

For the purpose of the present specification, the term "draping around" is understood to include draping "around" the interior of the cylindrical object, for instance when the object concerns a tube or a pipe.

The term "pliable support structure" includes not only support structures formed from a pliable or compliant material but also support structures comprising two or more relatively rigid parts that are movable relative to each other to convey pliability, such as pivotably inter-hinged shell parts or separate shell parts that may be interconnected after bringing them together.

The subject matter of the present invention is described with specificity however, the description itself is not intended to limit the scope of the invention. The claimed subject matter thus, might also be embodied in other ways to include different steps or combinations of steps similar to the ones described herein, in conjunction with other present or future technologies. Moreover, although the term "step" may be used herein to connote different methods employed, the term should not be interpreted as implying any particular order among or between various steps herein disclosed except when the order of individual steps is explicitly described.

The following description refers to the use of strain sensors in the form of a plurality of transducers that may comprise one or more conventional FBG sensors such as, for example, the transducers described in U.S. Pat. Nos. 5,798,521, 6,426,496, or 6,854,327. Optionally, FBG sensors may be i) specially treated (short-term blazed) as described in "Characteristics of short-period blazed FBG sensors for use as macro-bending sensors", APPLIED OPTICS, 41, 631-636 (2002), Baek, S., et al.; and/or ii) bent as described in "Long-Period Fiber Grating Bending Sensors in Laminated Composite Structures", SPIE Conference on Sensory Phenomena and Measurement Instrumentation for Smart Structures and Materials, March 1998, San Diego, Calif., SPIE Vol. 3330, 284-292, Du, W., et al.; and/or iii) coated as described in "Ultrastrong Fiber Gratings and Their Applications", SPIE Conference Phototonics East "Optical Fiber Reliability and Testing", 3848-26, Sep. 20, 1999, Starodubov, D. S., et al.

Optical fiber that is treated with Fiber Bragg Gratings may be suitable for use in monitoring compaction-induced strain on the tubular object. Fiber Bragg Gratings may be made by laterally exposing the core of a single-mode fiber to a periodic pattern of intense UV light. This creates areas of increased refractive index within the fiber. The fixed index modulation is referred to as a Fiber Bragg Grating (hereinafter "FBG"). All reflected light signals combine coherently to one large reflection at one wavelength when the grating period is equal to half the input wavelength. Other wavelengths of light are, for all intents and purposes, transparent. Light therefore, moves through the grating with negligible attenuation or signal variation with only the Bragg wavelength being affected, i.e., strongly backreflected at each FBG sensor. In other words, the center frequency of the grating is directly related to the grating period, which is affected by thermal or mechanical changes in the environment. Thus, temperature, strain and other engineering parameters may be calculated by measuring the normalized change in reflected wavelength. Being able to preset and maintain the grating wavelength is, thus, what makes FBG sensors so useful. See "Fiber Bragg Grating" 3M US Online, 27 Nov. 2000.

The present invention, however, is not limited to the use of FBG-type sensors and may be implemented with conventional sensors or transducers capable of detecting axial and/or radial strain such as, for example, strain gauges as described in "Strain Gauge Technology," A. L. Window (Editor), Elsevier Science Pub. Co., 2$^{nd}$ edition, November 1992. Thus, the novel techniques and methods described herein may be implemented and applied through the use of any type of strain sensor or transducer capable of detecting signals and transmitting signals, regardless of whether it is a FBG sensor, strain gauge or other conventional type sensor or transducer. Furthermore, the use of an optical fiber as a transmission means to illustrate various applications of the invention described herein is not exclusive of other well-known transmission means that may be used to connect the transducers such as, for example, electrical wires, which are capable of transmitting power and a signal. Furthermore, conventional wireless transducers may be used provided that they include a power source.

Referring now to FIG. 1, an elevational view of a cylindrical object 10 such as, for example, a tubular object (e.g., drill pipe) or casing, is illustrated with a plurality of FBG type sensors 20 applied to the object 10 on a fiber 30 at different preferred wrap angles in sections A, B and C. FIG. 1A is a linear perspective of section A in FIG. 1, illustrating the fiber 30 wrapped around the tubular 10 at a preferred wrap angle represented by $\theta_1$ or $\theta_2$. The preferred wrap angle may be measured relative to a first imaginary reference line 40 extending longitudinally along a surface of the object 10. Alternatively, the preferred wrap angle may be measured relative to a second imaginary reference line 50 circumferencing the object 10, which also represents the circumference (C) in FIG. 1A. For purposes of the following description, however, wrap angle $\theta$ and preferred wrap angle $\theta_1$ are defined relative to the second imaginary reference line 50 and is represented by $\theta_1$. Nevertheless, $\theta_2$ could be used, instead, by simply substituting $\pi/2-\theta_2$ for $\theta_1$ or calculating $\theta_1$ based on $\theta_2$ as $\theta_1 = 90° - \theta_2$.

In FIG. 1A, the length of one wrap of fiber 30 around the object 10 is represented as S. The distance along the first imaginary line 40, which may be the vertical distance between each wrap of fiber 30, is represented as L. Relationships between $\theta_1$, L, X, S, and C are illustrated by: $L = S^* \sin(\theta_1)$ and $C = S^* \cos(\theta_1)$. In this transformed geometry, S represents the hypotenuse of a right triangle formed by L, C, and S.

Axial strain along the axis of the object 10 caused by compaction can be represented as $\epsilon = \Delta L / L$. Axial strain along the axis of the object 10 caused by compaction can be translated to strain in the strain sensor 20 and represented as $\epsilon_f = \Delta S / S$, which may manifest itself in the strain sensor 20 as axial, hoop and/or sheer stress. The relationship between strain ($\epsilon_f$) in the strain sensor 20 and its wavelength response is therefore, represented by:

$$\Delta\lambda = \lambda(1 - P_e) K \epsilon_f$$

where $\Delta\lambda$ represents a strain sensor wavelength shift due to strain ($\epsilon_f$) imposed on the strain sensor 20 and $\lambda$ represents the average wavelength of the strain sensor 20. The bonding coefficient of the strain sensor 20 to a substrate or system on which the strain is to be measured is represented by K.

A "combined" response for bending (also buckling, shearing) and axial strain may be represented by:

$$\Delta\lambda = \lambda(1-P_e) \cdot K \cdot \left( -1 + \sqrt{\sin^2\theta \cdot \left(1 - \left(\varepsilon - \frac{r\cos\phi}{R}\right)\right)^2 + \cos^2\theta \cdot \left(1 + \nu\left(\varepsilon - \frac{r\cos\phi}{R}\right)\right)^2} \right)$$

wherein $\Delta\lambda$ is the wavelength shift measured on a given grating and $\lambda$ is the original wavelength of the grating which may nominally be 1560 nanometers. The term $(1-P_e)$ is a fiber response which is nominally 0.8. Bonding coefficient K typically may be 0.9 or greater. The wrap angle (or orientation angle of the sensor) with respect to first imaginary axis of the tubular is represented by $\theta$. The axial strain $\epsilon$ on the tubular that may be from compaction or other external source. The radius of the tubular or cylindrical object is represented by r, and $\phi$ is an arbitrary azimuth angle with respect to some reference along the axis of the tubular that allows one to orient the direction of the buckle or bend with respect to this. Capital R represents the bend radius of the buckle or bend in the pipe. As the bend radius gets very large (straight unbent pipe), this portion of the signal vanishes. The Poisson ratio $\nu$ of the object may change with strain. An independent measurement may be employed to extract the value of $\nu$. One can, by using two wrap angles simultaneously, solve for this.

For simplicity in the examples that follow, the bonding coefficient (K) is assumed to be constant. $P_e$ represents the strain and temperature effect on the index of refraction of the strain sensor 20. $P_e$ may be a function of strain and temperature, including torque on the strain sensor 20, but is neglected in the following examples. Since it is well known that temperature variations may impart additional strain to the fiber 30, the strain sensors 20 and object 10, which affect the index of refraction in the fiber 30, temperature variations may be considered independently for calibrating the strain measurements. This can easily be done either by a separate temperature measurement that could be performed by mechanically decoupling short lengths of the fiber 30 from the object 10, using a separate but similar fiber that is entirely decoupled mechanically from the object 10 or by any other means of measuring the temperature in the vicinity of the object 10 undergoing the strain measurement.

The foregoing properties may be used to relate the strain ($\epsilon_f$) in the strain sensor 20 to the axial compaction strain ($\epsilon$) in the object 10. The strain ($\epsilon_f$) in the strain sensor 20 can be related to the preferred wrap angle ($\theta_1$) and the strain ($\epsilon$) along the axis of the object 10 by:

$$\frac{\Delta S}{S} = -1 + \sqrt{\sin(\theta_1)^2 * (1-\varepsilon)^2 + \cos(\theta_1)^2 * (1+\nu\varepsilon)^2}$$

The Poisson ratio ($\nu$) is an important property of the object 10, which is relevant to the strain ($\epsilon$) the object 10 may encounter as illustrated in the examples to follow.

The strain factor relating axial strain ($\epsilon$) in the object 10 to strain ($\epsilon_f$) transmitted to the strain sensor 20 is represented by:

$$m = \frac{-1 + \sqrt{\sin(\theta_1)^2 * (1-\varepsilon)^2 + \cos(\theta_1)^2 * (1+\nu\varepsilon)^2}}{\varepsilon}$$

which may also be translated to:

$\Delta S/S = m * \Delta L/L = m * \epsilon$.

Comparison of the strain factor (m) to other variables reveals that it is highly sensitive to the preferred wrap angle ($\theta_1$), somewhat sensitive to the Poisson ratio ($\nu$), and quite insensitive to applied axial strain ($\epsilon$).

Application of the Sensors

The primary requirements for sensitivity and resolution are a sufficient number of sensors 20 positioned around the circumference (C) of the object 10 and adequate vertical spacing between the sensors 20 so that a sinusoidal pattern associated with a bend, buckle, shear or crushing (ovalization) force can be clearly detected and imaged. As demonstrated by the relationships below, sensitivity to axial strain and radial strain, and hence bending strain, is also a function of the preferred wrap angle ($\theta_1$).

A desired sensitivity to axial strain in the cylindrical structure may be selected based on considerations as set forth below. Also set forth below, at least one strain factor corresponding to the desired sensitivity may be calculated. Such a strain factor represents a ratio between strain transmitted to the strain sensor as caused by axial strain in the cylindrical structure and the axial strain in the cylindrical structure. A preferred wrap angle relative to an imaginary reference line extending along a surface of the cylindrical structure may then be determined, in dependence of the at least one determined strain factor. The strain sensor may then be applied to the cylindrical structure in alignment with the preferred wrap angle to measure strain in the direction of the preferred wrap angle.

Preferably, at least ten strain sensors 20 per wrap of the fiber 30 may be used to adequately capture one cycle of the sinusoidal signal produced by a deformation of the object 10. It is also desirable to have at least eight to ten turns or wraps of the fiber 30 covering the vertical distance of the object 10 over which the deformation is expected to occur. Fewer strain sensors 20 will reduce the resolution and ability to unambiguously distinguish between a bend, buckle, shear or crushing type deformation. In terms of the preferred wrap angle ($\theta_1$) and the diameter (D) (in inches) of the object 10 the length of object 10 (in feet) covered by each wrap is represented as:

$$L_1 = \frac{\pi * D * \tan(\theta_1)}{12}$$

To obtain the length in feet, the length in meters must be divided by 0.30. To obtain the diameter in inches, the diameter in centimeters must be divided by 2.54.

In terms of the preferred wrap angle ($\theta_1$) and the diameter (D) (in inches) of the object 10, the length of one wrap around the object 10 (in feet) is represented as:

$S_1 = \pi \cdot D / (12 \cdot \cos(\theta_1))$

The total length of the fiber 30 (in feet) based on a preferred number of wraps ($N_w$) around the object 10 and the length of one wrap ($S_1$) around the object 10 (in feet) is represented as:

$S = S_1 * N_w$

The axial length of the fiber 30 (in feet) along the object 10 is based on a preferred number of wraps ($N_w$) around the object 10 and the length of object 10 (in feet) covered between each wrap is represented as:

$Z = L_1 * N_w$

Thus, the preferred number of wraps ($N_W$) around the object 10 may be determined by the axial length (Z) of the object 10 wrapped in the fiber 30 divided by the length ($L_1$) of object 10 covered between each wrap of the fiber 30. In addition to the preferred wrap angle ($\theta_1$), the preferred number of wraps ($N_W$) may be used to determine a preferred application of the fiber 30 and strain sensors 20 to the object 10.

The strain sensor spacing may be as short as 1 centimeter or as long as necessary to accommodate a judicious number of strain sensors 20 per wrap of the fiber 30 on a object 10 having a large diameter. The total number of strain sensors 20 per wrap of the fiber 30 as a function of strain sensor spacing ($S_g$) (in centimeters) and wrap length ($S_1$) is represented as:

$$n = \frac{2.54 * S_1 * 12}{S_g} = \frac{2.54 * \pi * D * \cos(\theta_1)}{S_g}$$

Assuming that all of the strain sensors 20 on the fiber 30 are within the wrapped portion of the fiber 30, then the total number of strain sensors 20 on the fiber 30 is represented as:

$$N = \frac{2.54 * S * 12}{S_g} = \frac{2.54 * N_w * \pi * D * \cos(\theta_1)}{S_g}$$

Similarly, the preferred strain sensor spacing ($S_g$) may be easily determined with a known preferred number of strain sensors (N) and a predetermined total length (S) of fiber 30.

Roughly, the maximum number of strain sensors 20 that can be used on one fiber 30 with this technique may be about 1000. Thus, the preferred wrap angle ($\theta_1$), the preferred number of wraps ($N_W$) and the preferred number of strain sensors (N) may be used to determine a preferred application of the fiber 30 and strain sensors 20 to the object 10.

Using the previous equations, plots such as the one in FIG. 2 may be compiled and used to determine the preferred number of strain sensors (N) and the preferred number of wraps ($N_W$) needed to cover a predetermined length and diameter for the object 10 and the preferred strain sensor spacing ($S_g$). Plotted on the left axis are the length of the fiber (S, in units of 0.30 meter—corresponding to feet), the axial length (Z, in units of 0.30 meter—corresponding to feet) of the object 10 wrapped in the fiber 30 and the total number (N) of strain sensors in the form of gratings that may be compared to a wrap angle range for a predetermined number of wraps ($N_W$) and a predetermined strain sensor spacing ($S_g$). Plotted on the right axis are the total number of gratings per wrap (n) and the axial length ($L_1$ in units of 0.30 meter—corresponding to feet) of the object 10 covered between each wrap that may be compared to a wrap angle ($\theta$) range for a predetermined strain sensor spacing ($S_g$) and a preferred number of wraps ($N_W$). In FIG. 2, line 1 plots the length of the object Z against wrap angle ($\theta$) for a case whereby D=15 cm (6.0 inches); line 2 plots the length of the fiber (S) for a case where the number of wraps ($N_W$)=100; line 3 plots the number of gratings having a spacing (S) of 5.0 mm; line 4 plots the number of gratings per wrap; and, line 5 plots the length of the object Z against wrap angle ($\theta_1$) per wrap.

In FIG. 2, D=152 mm (6 inches), $N_W$=100 and $S_g$=5 mm. This figure shows that wrap angles between 20 and 40 degrees tend to optimize resolution considering the length of fiber (S) and the length of the object (Z) being monitored. This information may be used with the strain factor (m) to design a preferred application of the fiber 30 to the object 10.

Figure 3:
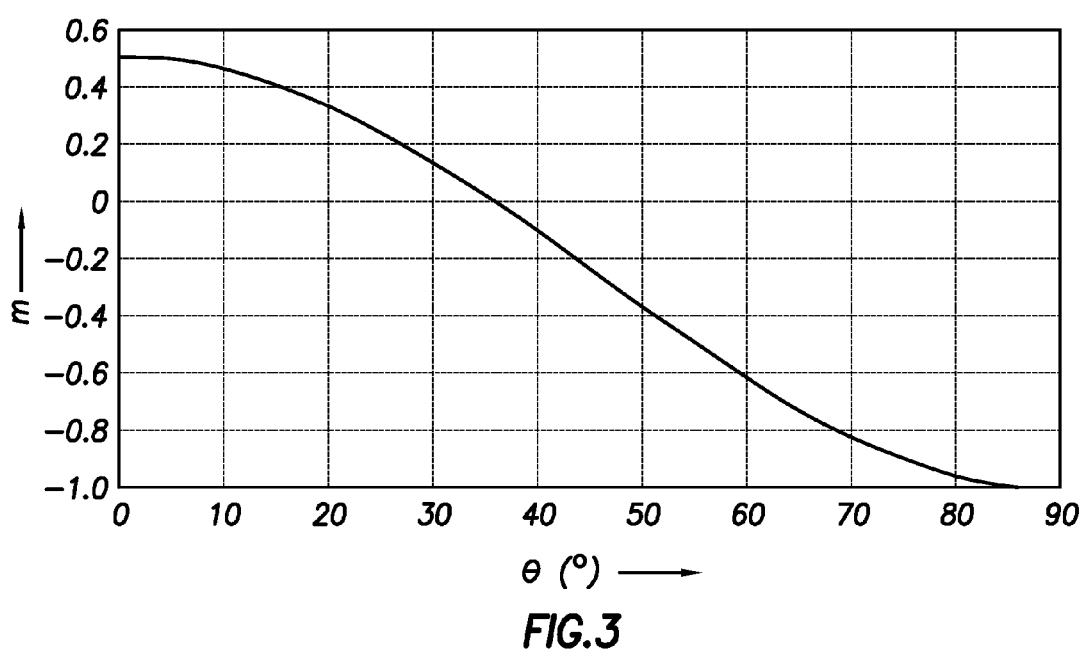
FIG. 3 is a graph illustrating the relationship between the strain factor (m) and various wrap angles ($\theta$)

FIG. 3, illustrates the relationship between the strain factor (m) and wrap angle $\theta$. A predetermined Poisson ratio ($\nu$) of 0.5 was chosen based on the observation of steel tubular performance after yielding at high compaction strains. A predetermined strain ($\epsilon$) of 5.0 percent was selected based upon the maximum anticipated strain the object may encounter.

Based on these structural parameters (P($\nu$), ($\epsilon$)), the strain factor (m) may be determined for each wrap angle illustrated in FIG. 3. The results in FIG. 3 reveal that the strain each strain sensor experiences can be decreased or even reversed (compression to tension) by carefully choosing the preferred wrap angle ($\theta$=$\theta_1$).

The ability to easily regulate the amount of strain the fiber and each strain sensor will be exposed to, and even the sign of the strain (tension vs compression) is very important. Most conventional fiber sensors manufactured from glass can be exposed to no more than one or two percent strain (in tension) before damage or failure occurs. Compressional strain in fiber sensors manufactured from glass is even more problematic. Thus, high axial compressional strain exerted on tubular objects in compacting environments can be converted to mild extensional strain in the fiber sensor by simply adjusting the wrap angle. The same principle may be applied to recalculate the amount of strain on other conventional sensor systems that may be used.

Figure 3A:
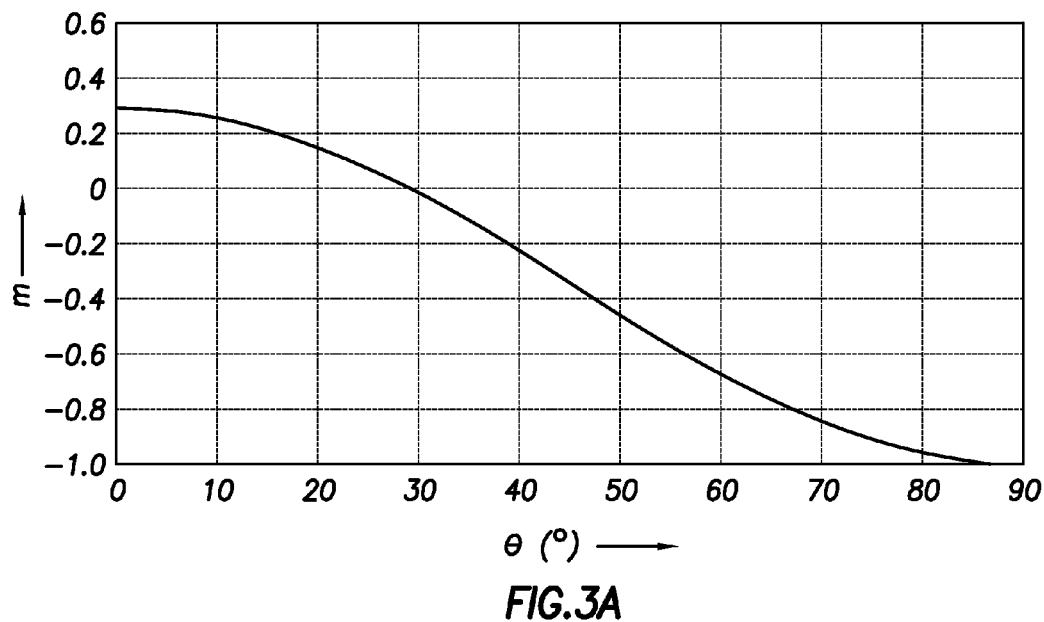
FIG. 3A is a graph illustrating the relationship between strain factor (m) and wrap angle ($\theta$) according to a predetermined Poisson ratio ($v$)

In FIG. 3A, the strain factor (m) is illustrated for each wrap angle $\theta$ according to a predetermined Poisson ratio ($\nu$) of 0.3 and a predetermined strain ($\epsilon$) of 0.10 percent for the object analyzed. These conditions could correspond to applications where mild compaction may be anticipated. For good sensitivity to mild compaction strains (compressional) and excellent sensitivity to lateral deformations, it may be advantageous based on FIG. 3A to select a preferred wrap angle of on the order of 20 degrees.

FIGS. 3 and 3A illustrate that, at a zero-degree wrap angle, the strain factor (m) is equal to the Poisson ratio ($\nu$). In other words, the compressional strain ($\epsilon$) on the object is translated to an axial expansion defined by Poisson's ratio ($\nu$). Likewise, in the limit of no wrap (vertical application along casing or a 90-degree wrap angle) the extension or compression of the object can be measured directly. The latter has the disadvantage that, in high compressional strains, the fiber and/or strain sensors are likely to be damaged and/or undergo buckling and mechanically disconnect from the object. But for mild extensional strains as often seen in an overburden layer, it may be best to choose 90 degrees or near 90 degrees, such as between 80 and 90 degrees) (corresponding to axial application or near-axial application).

Figure 4:
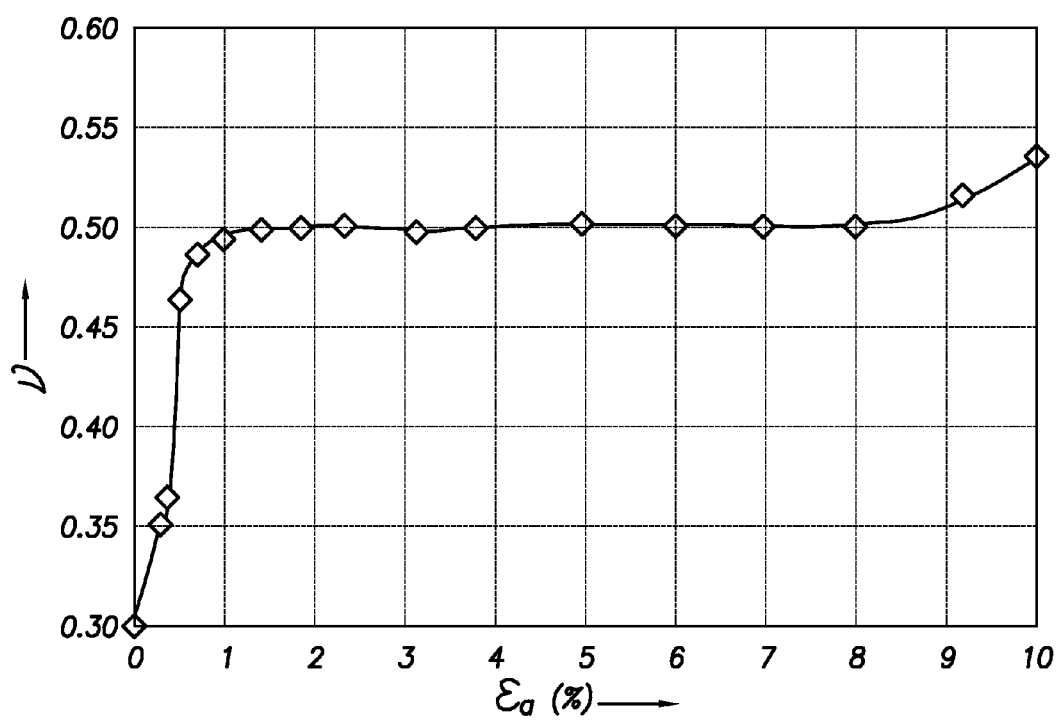
FIG. 4 is a graph illustrating the relationship between strain ($\epsilon$) applied to steel and corresponding Poission's ratio ($v$)

FIG. 4 illustrates Poisson's ratio ($\nu$) for steel versus strain applied. For steel behaving elastically, the nominal Poisson ratio is near 0.3. It has been observed that the Poisson ratio ($\nu$) of tubular objects undergoing high compaction strains (beyond the elastic limit) is better approximated at 0.5. This is a theoretical limit for the conservation of volume. The Poisson ratio ($\nu$) may therefore, be predetermined according to the anticipated or maximum strain the object may encounter, however, may be between about 0.3 and about 0.5 for tubular steel objects. As a general rule, the Poisson ratio ($\nu$) may be approximated at 0.5 if the predetermined strain is at least 0.3 percent or greater in a tubular steel object.

The principles illustrated in FIG. 3 and FIG. 3A may be used to determine a preferred application of the strain sensors 20 to the substantially cylindrical object 10 in FIG. 1A for monitoring deformation of the object in various formation environments. According to one method, a preferred wrap angle range (e.g., between 0 and 90 degrees) may be selected for determining the relative strain factor (m) associated with each wrap angle in the preferred wrap angle range. A broad wrap angle range between 0 degrees and 90 degrees may be preferred, however, different, narrower, ranges may be selected. The strain factor (m) should be determined for at least one wrap angle within the preferred wrap angle range. The preferred wrap angle ($\theta_1$) within the preferred wrap angle range may be determined based on at least one determined strain factor (m), and used to determine the preferred application of the strain sensors 20 to the object 10 in FIG. 1A. As illustrated in FIG. 2, a number of other variables, including the preferred number of strain sensors (N) and the preferred number of wraps ($N_w$), may also be considered in determining the preferred application of the strain sensors 20 to the object 10 based on sensitivity and resolution requirements.

Determining the preferred wrap angle ($\theta_1$) within the preferred wrap angle range may, alternatively, be based on a preferred strain factor range comprising a plurality of the strain factors determined in the manner described above. The determined strain factor or determined strain factor range may be selected to determine the preferred wrap angle ($\theta_1$) within the preferred wrap angle range based on a maximum strain the strain sensor 20 and/or fiber 30 can withstand. If a transmission means other than the fiber 30 is used, or wireless transducers are used, then the determined strain factor or determined strain factor range used to determine the preferred wrap angle ($\theta_1$) within the preferred wrap angle range may be based on a maximum strain the alternative transmission means and/or transducers, or wireless transducers, can withstand.

In FIG. 3, for example, the predetermined Poisson ratio ($\nu$) and anticipated axial strain ($\epsilon$) reveal a need for sensitivity to high compaction strains. Assuming the strain sensors and/or fiber are limited to about 2 percent strain before failure occurs, then the wrap angle at which the strain sensors and/or fiber may fail at 5 percent anticipated strain on the object is determined by dividing the maximum strain the strain sensor and/or fiber may withstand (0.02) by the anticipated strain (0.05), which reveals a strain factor (0.4) that corresponds with a wrap angle of about 15 degrees. Consequently, a wrap angle of greater than about 15 degrees is required to prevent damage to the strain sensors and/or fiber and preferably may be about 30 degrees. A wrap angle greater than about 35 degrees, where the strain factor is zero, may produce undesirable compression and buckling in the fiber and/or strain sensors.

Once a preferred application of the strain sensors has been determined, the strain sensors may be applied to the object 10 along a preferred application line represented by the fiber 30 in FIG. 1A. The preferred wrap angle may be formed between the preferred application line and the first imaginary reference line 40 or the second imaginary reference line 50. Such an application line may be generally straight except for any curvature imposed by following the curvature of the object to which the strain sensors are to be applied.

The strain sensors 20 and the fiber 30 may be applied to an exterior surface of the object 10 (as illustrated in FIG. 1), an interior surface of the object 10, a channel within the object 10 or be made an integral component of the object 10 when forming or manufacturing the object 10. In the event that the tubular object 10 comprises a screen assembly having multiple screen components, including a sand screen, the strain sensors 20 and the fiber 30 may be applied to an interior surface and/or an exterior surface of one of the multiple screen components or in a channel within any one of the multiple screen components or between any two of the component layers. Additionally, the strain sensors 20 and the fiber 30 may be applied to an exterior surface of one of the multiple screen components and the interior surface of another one of the multiple screen components.

Furthermore, the strain sensors 20 and the fiber 30 may be applied to the object 10 in a protective sheath and/or a protective sheet coating the strain sensors 20 and the fiber 30, provided that the protective coating is capable of transferring strain from the object 10 to the strain sensors 20. Acceptable protective coatings may comprise, for example, a metal, a polymer, an elastomer, a composite material or a thin tube comprising one or more of these materials that is flexible yet capable of being applied to the object 10 in a way that couples the strain experienced by the object 10 with the strain sensors 20. In the event the object 10 must be run in a well bore, the strain sensors 20 and fiber 30 may be applied before the object 10 is run in the well bore.

Alternatively, the strain sensors 20 and the fiber 30 may be applied to the object 10 after it is run in the well bore using a conduit, or may be applied to the interior or exterior surface of the object 10 after the object 10 is run in the well bore. Any conventional conduit capable of being coupled to the object 10 is acceptable. Acceptable materials for the conduit may comprise, for example, a metal, a polymer, an elastomer, a composite material or a thin tube comprising one or more of these materials that is flexible yet capable of being applied to the object 10 in a way that couples the strain experienced by the object 10 with the strain sensors 20.

The strain sensors 20 and the fiber 30 may be introduced into an opening in the conduit and positioned therein with a fluid capable of securing the strain sensors 20 and the fiber 30 within the conduit and transferring strain on the object 10 to each strain sensor 20. In one example, the fluid may at least partially solidify and secure the strain sensors within the conduit. The fluid may, for example, comprise any conventional polymer, polymer solution, polymer precursor, or epoxy. The fluid may also be used to convey the strain sensors 20 and the fiber 30 through the conduit. Additionally, the strain sensors 20 and the fiber 30 may be positioned in the conduit with the fluid by applying force on either, or both, ends of the fiber 30 to push and/or pull the same through the conduit. For example, a weighted object may be attached to the leading end of the fiber 30 to propel (pull) the fiber 30 and strain sensors 20 through the conduit. The conduit may be positioned within the object 10 along the preferred application line or on the object 10 along the preferred application line. In either case, the preferred wrap angle may be formed between the preferred application line (represented by the fiber 30 in FIG. 1A) and the first imaginary reference line 40 or the second imaginary reference line 50. If the object 10 comprises a screen assembly having multiple screen components, the conduit may be positioned within one of the multiple screen components along the preferred application line or on one of the multiple screen components along the preferred application line.

Application of the strain sensors 20 and fiber 30 to a object 10 after it has been positioned in a well bore may be preferred in that this technique does not require the tubular object to be rotated or a fiber spool to be rotated about the object during application of the strain sensors 20 and the fiber 30. Similar advantages may be preferred by application of the strain sensors 20 and the fiber 30 to the object 10 in a protective sheet, which may be positioned on the object 10 and fastened along one side as described further in U.S. Pat. No. 6,854,327.

Multiple and Variable Wrap Angles

As reservoir depletion progresses, the sensitivity/resolution requirements and strain factors are likely to change. By combining multiple wrap angles over a single zone of the formation, the sensitivity and dynamic range of the measurements may be extended. For example, a fiber wrapped at 20 degrees may fail at one level of strain while the same fiber wrapped at 30 degrees or more may not fail at the same level of strain or at a slightly higher level of strain.

Another advantage multiple wrap angles provide is better characterization of the change in the Poisson ratio (v) as the structural material yields under higher strains. Common steel used in tubulars may have a Poisson ratio of near 0.3 while it is elastic but trends toward 0.5 after the material yields. Applying the fiber 30 and strain sensors 20 at two or more wrap angles, as illustrated in FIG. 1, will allow the characterization of this change. This is particularly important for fibers that are wrapped near the angle that would null the fiber strain. This null point changes primarily as a function of the Poisson ratio (v) for the object 10. With multiple wrap angles, this behavior can be measured directly on the object 10 in the well while it is undergoing compaction strain. Thus, if different wrap angles may be preferred due to different forces acting on the tubular object, the methods described above in reference to FIGS. 3 and 3A may be used to determine another preferred wrap angle within the preferred wrap angle range. The preferred application of the strain sensors 20 may be based on the preferred wrap angle and another preferred wrap angle and applied to the object 10 over the same section or over different sections as illustrated by section B and sections A, C in FIG. 1, respectively. In either case, the preferred wrap angle and another preferred wrap angle may each be determined according to a respective determined strain factor (m). Each respective determined strain factor (m) may be selected according to a predetermined force and another predetermined force to be applied to the object 10, over the same section or over different sections, which impacts the same by variations in the Poisson ratio (ν) and axial strain (ε).

Restrictions on the number of strain sensors, the wrap length and the strain sensor spacing may also be overcome using multiple wrap angles. Therefore, multiple wrap angles may be used to extend the measuring length of a single region along the object or span multiple zones along the object as illustrated in sections A, B and C of FIG. 1. The addition of multiple wrap angles may also be used to branch into multiple objects such as multi-lateral wells.

Although the wavelength response is more complicated, the application of the fiber 30 and the strain sensors 20 at variable wrap angles may also be desirable. Configurations utilizing multiple and variable wrap angles over a single section of the object 10, like section B in FIG. 1, may be preferred. Other configurations, such as those suggested in U.S. Pat. No. 6,854,327, may be used, however.

The present invention will now be described further with reference to its application in different formation environments such as, for example, formation shear and formation compaction. In each of the examples to follow, a cylindrical object was tested using a Distributed Sensing System (DSS) manufactured by Luna Innovations Incorporated under license from NASA. The LUNA INNOVATIONS® Distributed Sensing System (DSS) utilizes technology covering an optical fiber containing multiple FBG sensors, and a projection device or monitor capable of imaging a wavelength response produced by the FBG sensors as a result of structural strain detected by the FBG sensors. The present invention, however, is not limited to such technology by the following examples, and other transmission means and transducers and/or strain sensors may be used as described hereinabove.

Formation Shear

Wells crossing a slip zone or a fault may be in danger of shearing. A shearing zone could be encountered when placing a well across a fault, through salt and/or across weak shale in a tectonically active area or an area undergoing compaction, such as the overburden area.

Shear movement may entirely shear off the well bore or at least restrict passage of tubing, workover equipment, and the like. It is, therefore, desirable to detect and measure the rate of shearing so that hydrocarbon or fluid off-take, well location, well design and similar considerations can be modified to mitigate or prevent damage to the tubular object and/or casing in the future.

Conventional techniques used to detect and measure shear movement often require tools such as gyroscopes or other devices to take measurements. For various reasons it may be impractical or impossible to run such conventional logging tools into the well. For example, the well may already have sustained considerable damage so that it cannot be entered.

Strain sensors, however, may be pre-positioned on the tubular object and/or casing without having to run conventional logging tools into the well. Accordingly, in-situ measurements can be taken of shear forces at any time without disturbing the well and with essentially no additional cost. The onset of damage can be observed substantially in real time so that remedial action can be taken as soon as possible.

Field experience reveals that shearing and buckling may result in a loss of clearance, or a complete shear-off, typically over a 0.9- to 1.8-meter (3- to 6-foot) interval of the tubular object or casing. Thus, a preferred application of the strain sensors to such a object in a shearing zone should be designed for at least this sensitivity.

Figure 5:
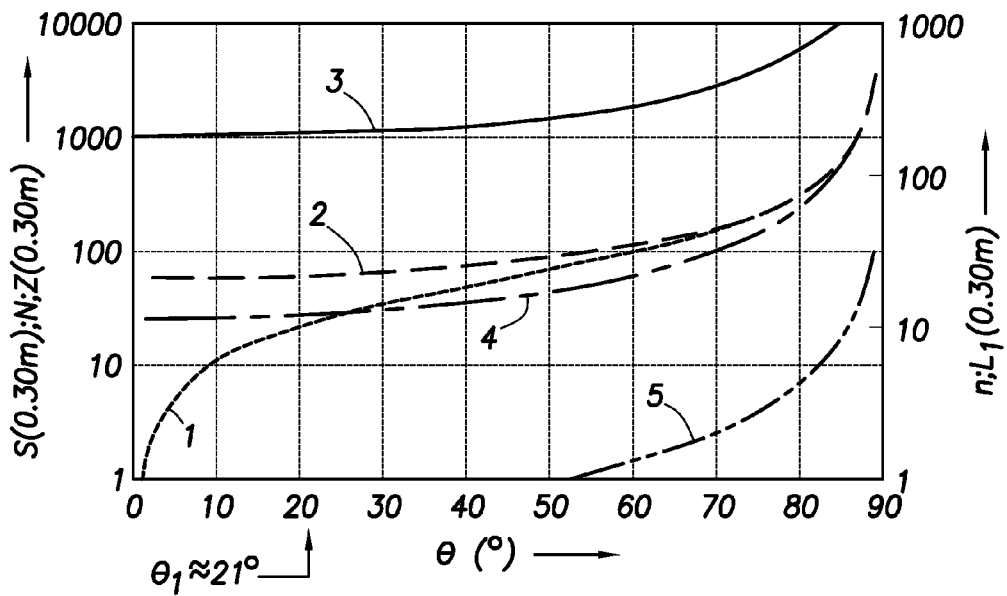
FIG. 5 is a graph illustrating the relationship between the length of sensing fiber and the length of the tubular object versus the wrap angle (θ)

In FIG. 5, line 1 plots the length of the object Z (in units of 0.30 meter) against wrap angle (θ) for a case whereby D=7.6 cm (3.0 inches); line 2 plots the length of the fiber (S) for a case where the number of wraps ($N_{wr}$)=80; line 3 plots the number of gratings having a spacing (S) of 2.0 mm; line 4 plots the number of gratings per wrap; and, line 5 plots the length of the object Z against wrap angle (θ) per wrap.

Assuming a 76-millimeter (3-inch) diameter tubular object to be monitored across a slip or shear zone, the location of which is known to be within ten feet, requires at least 6.1 meters (20 feet) of coverage along the tubular. Applying the principles taught by the present invention to the known variables illustrated in FIG. 5 reveals that about 20.4 meters (67 feet) of sensing fiber is needed to cover about 7.3 meters (24 feet) of the tubular object assuming a preferred wrap angle of about 21 degrees. Given a preferred strain sensor spacing of about 2 centimeters, about 12 strain sensors per wrap are recommended, which is greater than the minimum recommendation of 10 strain sensors per wrap. The total number of strain sensors is about 1000.

A need also exists for imaging deformation of an object, in order to image the shape and magnitude of the deformation. The same wrap technique may be used to image, detect and measure bending and buckling of the cylindrical object as will be explained in the forthcoming examples.

EXAMPLE 1

Figure 6:
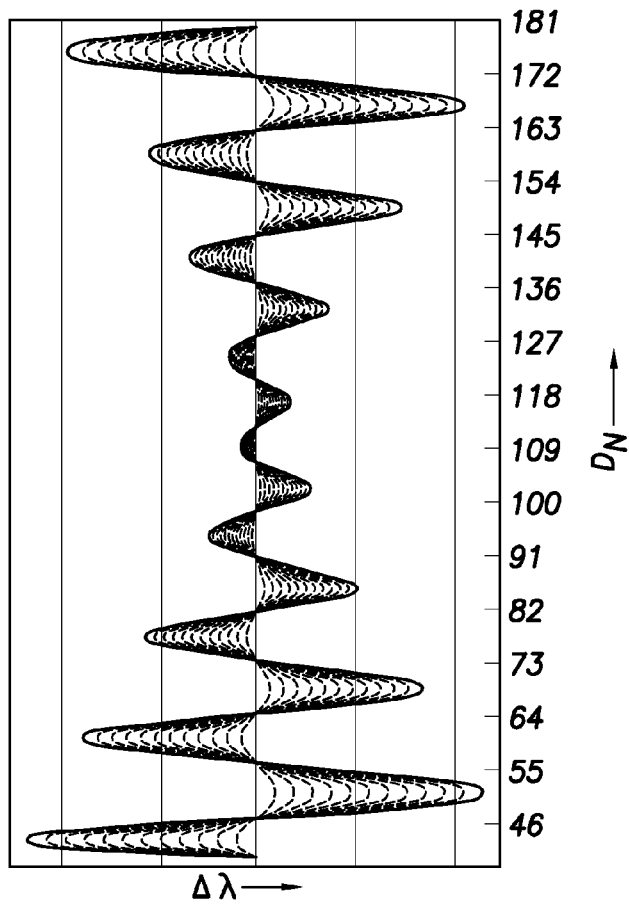
FIG. 6 is a graphical illustration of the resulting wavelength response, relative to $D_N$ numbered strain sensor, from a cylindrical object undergoing offset shear in a controlled test.

FIG. 6, illustrates the resulting wavelength response, relative to each numbered strain sensor, from a cylindrical object undergoing offset shear in a controlled test. The cylindrical object is seventy-six (76) millimeters (three (3) inches) in diameter and six hundred ten (610) millimeters (twenty-four (24) inches) long. Although the strain sensor spacing along the optical fiber in this test is about 1 centimeter, a spacing of 2 centimeters may be adequate to measure the same shear response in a cylindrical object with the same diameter. A preferred wrap angle of about 20 degrees was used. The detectable variation in wavelength response, representing lateral offset, was between 0.025 mm (0.001 inches) up to about 15.24 mm (0.600 inches).

In this example, a 0.025 mm (0.001-inch) lateral offset translates into a dogleg in the object of about less than one-half degree for each one hundred-foot section of the object, which is inconsequential. However, a lateral offset of about 2.54 mm (0.1 inch) over the same length of object translates into a dogleg of approximately 48 degrees for each 30.5 meter (one hundred-foot) section of the object, which could prevent entry with production logging tools. Knowing the magnitude of the lateral offset (dogleg) before attempting entry could therefore, prevent lost and stuck logging tools and lost wells.

The wavelength response illustrated in FIG. 6 may be imaged, in real time, on a projection device such as the monitors manufactured by Luna Innovations. The detection of variations in the wavelength response at each strain sensor as the object is being monitored will reveal changes in the deformation of the object and what type of force is causing the object to deform. Variations in the wavelength response are therefore, revealed by variations in the amplitude of the wavelength response at each strain sensor. The ability to detect strain on the object and image the same in the form of a wavelength response on a projection device, however, is not limited to a cylindrical object and may be applied to most any object capable of transferring strain from the object to the strain sensor.

FIG. 7 represents a simple illustration of a shear force applied to the object 10. Here, the object 10 is subjected to a shearing force 210 on one side of the object 10 and another shearing force 220 on another side of the object 10. The wavelength response, representing strain on the object 10 measured by the strain sensors 20, associated with the shearing forces 210, 220 is periodic and approximately sinusoidal as illustrated in FIG. 7A. The period of wavelength response or signal is equal to about one cycle per wrap of the fiber 30 around the object 10. The amplitude of the periodic signal is determined by the magnitude of shear forces 210, 220. The wavelength response in FIG. 7A is positioned adjacent the object 10 in FIG. 7 to illustrate points of strain on the object 10 and the corresponding wavelength response produced as a result of such strain. For example, the strain on the object 10 between the shear forces 210, 220 is minimal compared to the strain on the object 10 near each shear force 210, 220 as illustrated by the maximum wavelength response 230 and minimal wavelength responses 240A, 240B. The minimal wavelength responses 240A, 240B also illustrate how the shear forces 210, 220 cause the object 10 to compress and stretch (in tension), respectively. The application of pre-positioned strain sensors 20 on the object 10 thus, enables in-situ detection of strain on the object 10, which can be translated through well-known conventional means and imaged in real time.

Formation Compaction

Axial compaction is commonly measured with radioactive tags and special logging tools, which typically requires shutting in the well. Measurement of strain on the tubular object or casing below one percent is difficult to achieve, however, with these conventional techniques. At higher strains, a bend or a buckle in the casing or tubular object is also difficult to detect without pulling the production tubing and running acoustic or mechanical multi-finger calipers or gyroscopes into the well.

The disadvantages associated with conventional means of detecting and measuring strain induced by axial compaction may be avoided with pre-positioned strain sensors. In other words, the application of pre-positioned strain sensors on the object may be used for in-situ detection and measurement of axial compaction forces in the manner described above.

EXAMPLE 2

In this example, accurate measurements of low strain and high sensitivity to bending or buckling induced by axial compaction are important objectives. A thin-walled PVC pipe was tested using the weight of the pipe, horizontally suspended by its ends, as the applied force. A preferred wrap angle of about 20 degrees was used to apply the strain sensors and optical fiber to a 3-meter (10-foot) long section of the pipe with a 16.5-centimeter(6.5-inch) diameter. A 5-centimeter strain sensor spacing was used to resolve the wavelength response from a buckle or a bend.

Figure 8:
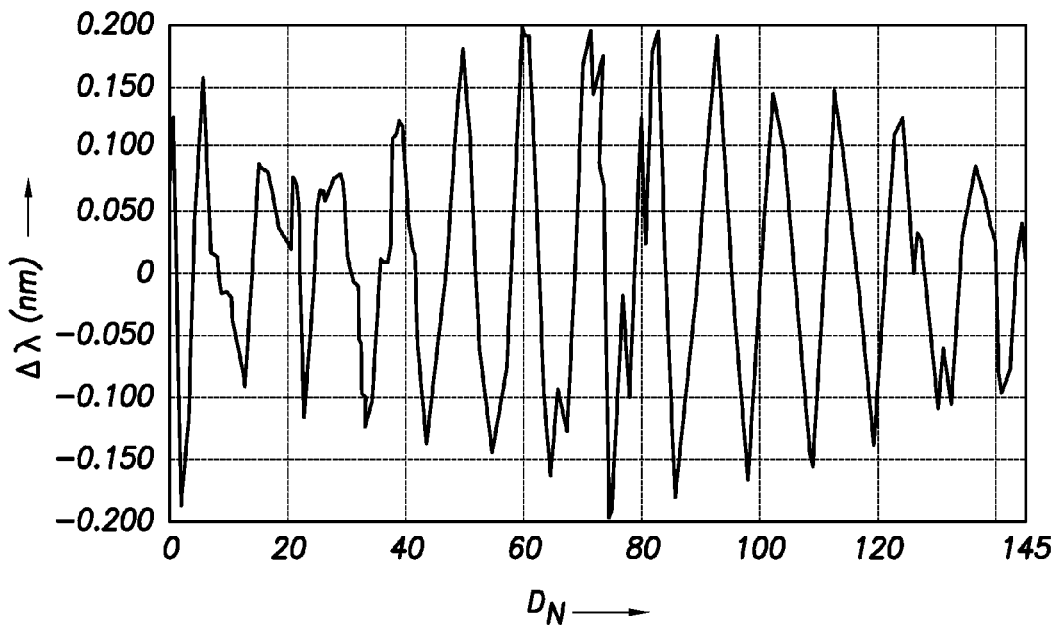
FIG. 8 is a graph illustrating the wavelength response resulting from the lateral force applied by the weight of a pipe, plotted as wavelength shift (Δλ) versus grating number ($D_N$)

In FIG. 8, the wavelength response resulting from the lateral force applied by the weight of the pipe is illustrated. A maximum lateral offset of about 1.78 mm (0.07 inches) was detected. The wavelength response in FIG. 8 clearly reveals a bend or a buckle because one period or cycle of the wavelength response corresponds to one wrap of the fiber. A 1.78 mm (0.07-inch) lateral offset represents less than a 7-degree bend or buckle for each one hundred-foot section of the pipe, which is significant and can be detected by conventional caliper and acoustic imaging tools. In order to run such tools into the well, the well must be shut in and the production tubing must be pulled.

EXAMPLE 3

Figure 9:
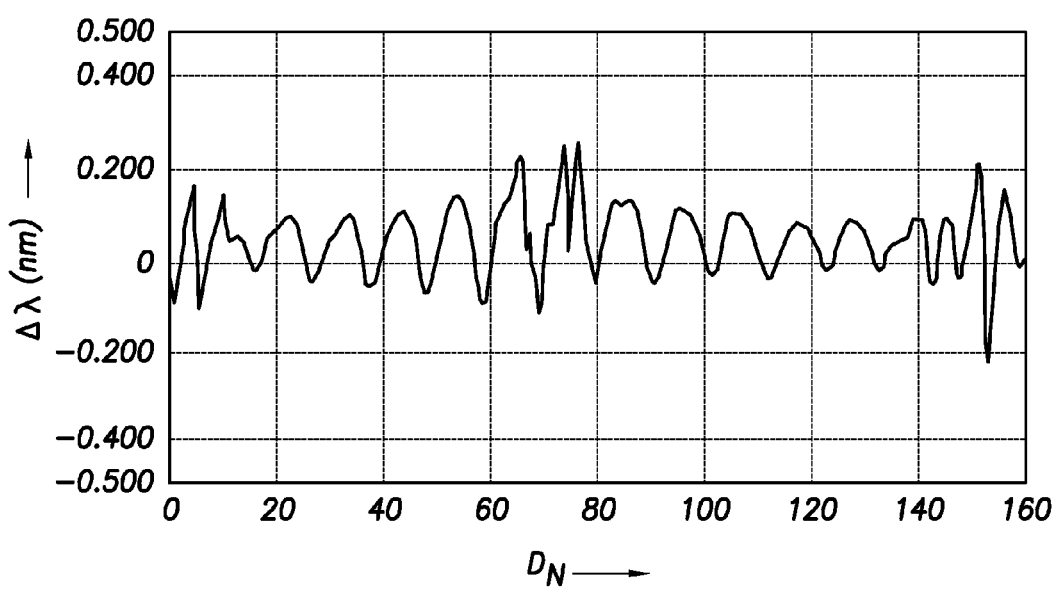
FIG. 9 is a graph showing the wavelength response resulting from the forces from a weight suspended from the center of the pipe horizontally suspended at each end, plotted as wavelength shift (Δλ) versus grating number ($D_N$)

In this example, the same pipe was tested using a weight hung from the center of the pipe, which was horizontally suspended at each end. The lateral offset due to a bend is about 5.791 millimeters (0.228 inches). As illustrated in FIG. 9, a relatively clean periodic signal is apparent everywhere except at the ends and at the center of the wavelength response where the weight is hanging and distorting the signal. The distorted signals are a special case related to pipe crushing caused by local loading on the pipe.

FIG. 10 represents a simple illustration of a lateral force on the object 10 induced by axial compaction. Here the object 10 is subjected to a lateral force 310 on one side of the object 10. The wavelength response, representing strain on the object 10 measured by strain sensors 20, associated with the lateral force 310 is periodic and approximately sinusoidal as illustrated in FIG. 1A. The period of the wavelength response or signal is equal to about one cycle per wrap of the fiber 30 around the object 10. The amplitude of the periodic signal is determined by the magnitude of the lateral force 310. The wavelength response in FIG. 10A is positioned adjacent the object 10 in FIG. 10 to illustrate points of strain on the object 10 and the corresponding wavelength response produced as a result of such strain. For example, the strain on the object 10 near the lateral force 310 is greater compared to the strain on the object 10 at each end as illustrated by the maximum wavelength responses 330A, 330B and the minimal wavelength response 320. The maximum wavelength responses 330A, 330B also illustrate how the lateral force 310 causes the object 10 to compress and stretch (in tension), respectively.

EXAMPLE 4

Figure 11:
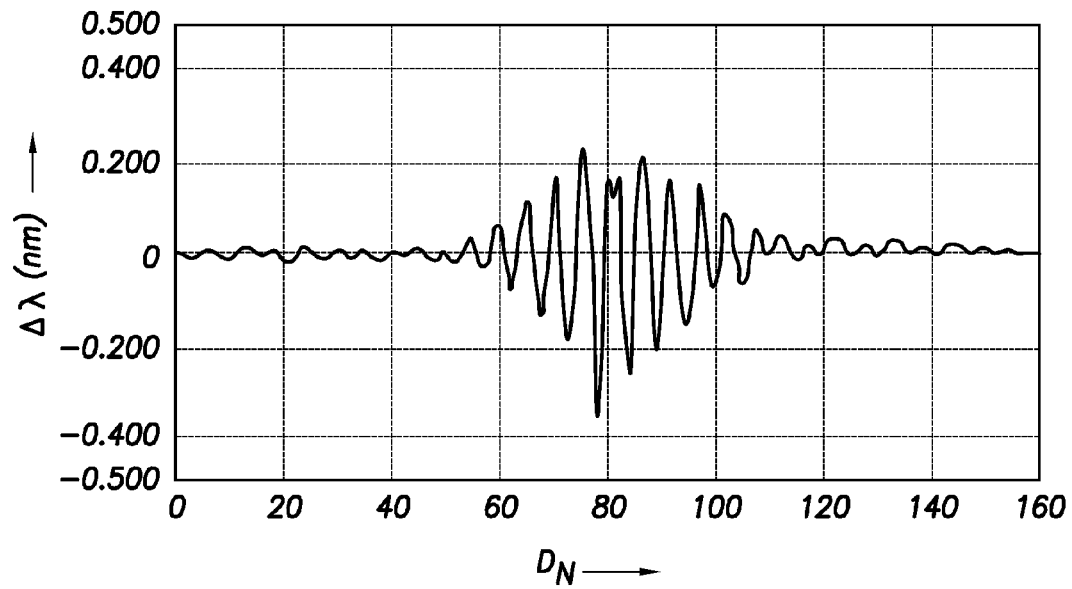
FIG. 11 is a graph illustrating the wavelength response resulting from the application of a crushing force applied near the center of the pipe of FIG. 8, plotted as wavelength shift (Δλ) versus grating number ($D_N$)

In addition to detecting a bend or a buckle, the onset of ovalization or crushing forces may also be detected and distinguished from a bend or a buckle. A pure ovalization or crushing force should produce a pure ovalization wavelength response. In this example, the same pipe was tested with clamps that were applied as a crushing force near the center of the pipe and slightly tightened with the orientation of the applied force aligned across the diameter of the pipe so as to slightly decrease its cross-sectional diameter. The resulting wavelength response is illustrated in FIG. 11, and reveals a period of about two cycles per wrap as opposed to one cycle. In this example, the minimum diameter is decreased by 1.27 millimeters(0.05 inches) due to the applied crushing force.

EXAMPLE 5

Figure 12:
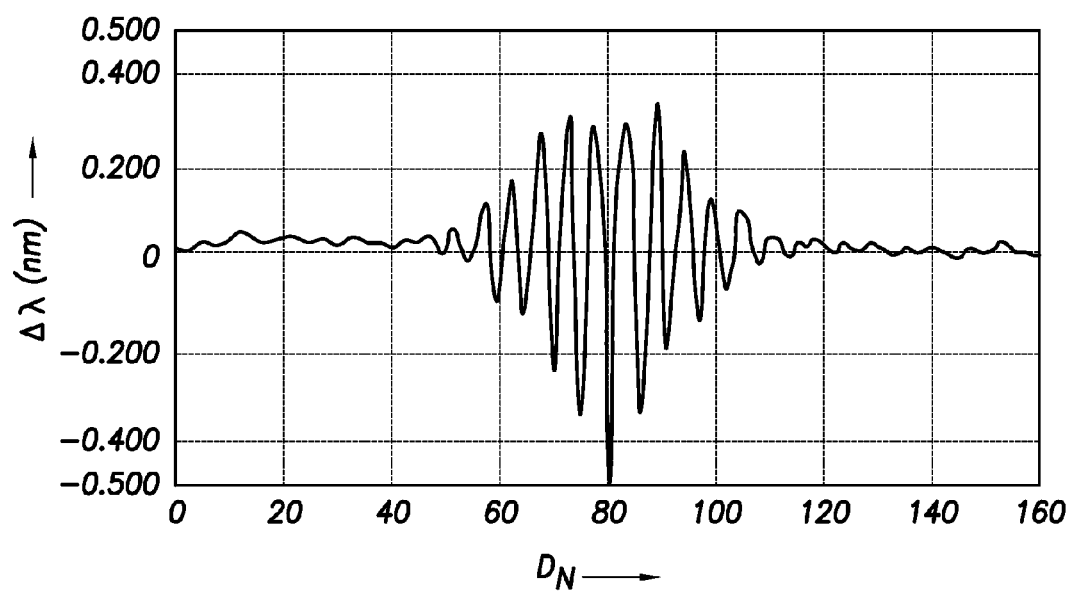
FIG. 12 is a graph illustrating the wavelength response for the pipe of FIG. 11, plotted as wavelength shift (Δλ) versus grating number ($D_N$), wherein the clamps near the center of the pipe have been rotated 90 degrees.

In this example, the same pipe was tested by rotating the clamps near the center of the pipe 90 degrees. The resulting wavelength response is illustrated in FIG. 12, and also reveals a period of about two cycles per wrap. In this example, the minimum diameter is decreased by 1.78 millimeters (0.07 inches).

The increased strain (and therefore deformation) is obvious when comparing FIG. 11 and FIG. 12. It is a simple matter to scale the resulting shift in wavelength to a strain and the resulting strain to a relative crushing.

FIG. 13 represents a simple illustration of a crushing force on the object 10 induced by axial compaction. Here, the object 10 is subjected to a crushing force 410 on all sides of the object 10. The wavelength response, representing strain on the object 10 measured by strain sensors 20, associated with the crushing force 410 is a substantially constant periodic signal as illustrated in FIG. 13A. The period of the wavelength response or signal is equal to about two cycles per wrap of the fiber 30 around the object 10, which is easily distinguished from the wavelength response exhibited by a bend or a buckle discussed in the examples above. The amplitude of the periodic signal is determined by the magnitude of the crushing force 410. The wavelength response in FIG. 13A is positioned adjacent the object 10 in FIG. 13 to illustrate points of strain on the object 10 and the corresponding wavelength response produced as a result of such strain. For example, the strain on the object 10 is substantially constant around the object 10 as illustrated by the substantially constant wavelength responses 420A, 420B.

In FIG. 13B, an end view of FIG. 13 illustrates the crushing force 410 and the resulting deformation of the object 10 illustrated by the dashed line 430.

Figure 14:
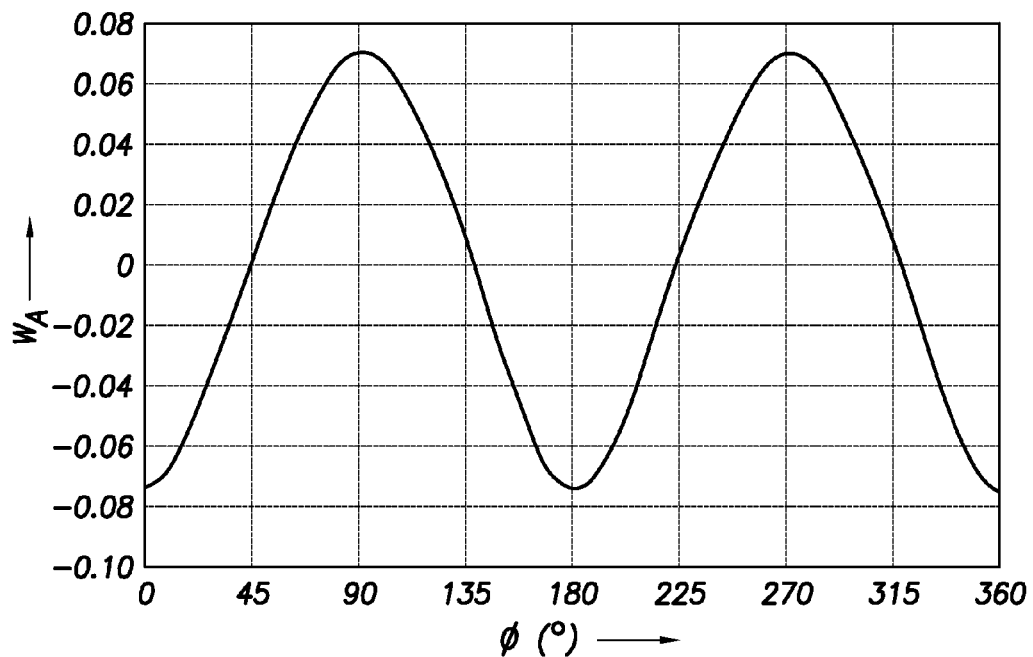
FIG. 14 is a plot illustrating the relative strain amplitude ($W_A$) as a function of the azimuth angle (ϕ) in degrees around a tubular object.

FIG. 14 further illustrates the relative strain amplitude ($W_A$), as measured by a wavelength response in the FBG sensor or other stain sensor or transducer, as a function of azimuth around a tubular object subjected to a crushing force. The maximum compressive strain (negative signal) occurs at 0 (or 360) and 180 degrees. The maximum tensile strain (positive signal) occurs at 90 and 270 degrees. The neutral stain occurs at 45, 135, 225, and 315 degrees.

EXAMPLE 6

Figure 15:
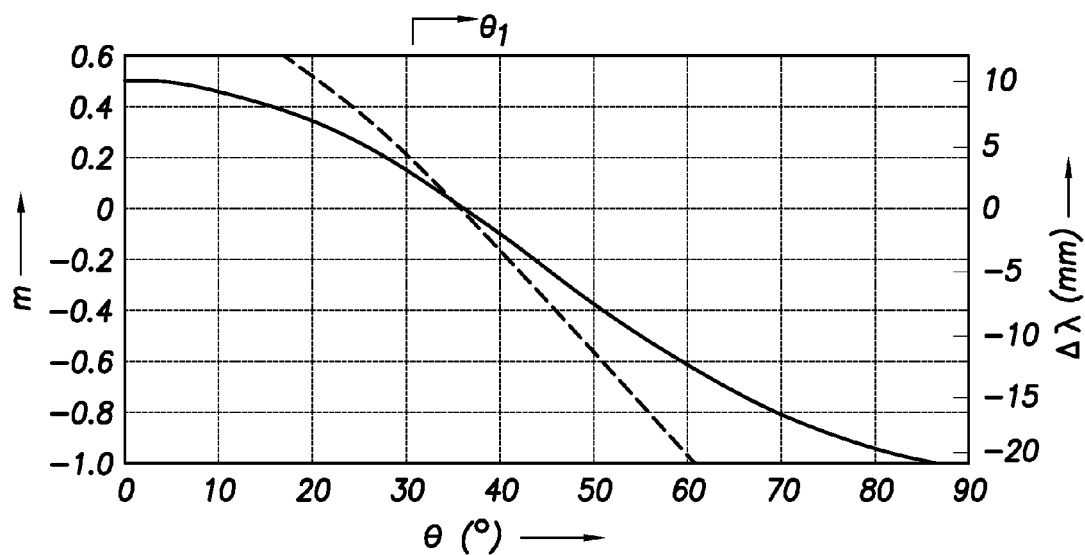
FIG. 15 is a graph illustrating the strain factor (m), and nm shift, versus wrap angle (θ) for a structural material undergoing plastic deformation.

In this example, the sensitivity is decreased to allow for measurements of higher axial strains ($\epsilon \cong 2$ percent) on a tubular object. As the structural material begins to undergo plastic deformation, the Poisson ratio ($\nu$) will tend towards 0.5 in the limit of plastic deformation. In FIG. 15, the solid line plots the strain factor m as a function of wrap angle $\theta$, assuming $\nu=0.50$ and $\epsilon \cong 2.0$ percent. Therefore, according to FIG. 15, a wrap angle of approximately $\theta_1=30$ degrees or greater is preferred. For example, a wrap angle of 30 degrees will yield a strain factor (m) of 0.15, which translates to a strain of 1.5 percent in the fiber for a 10 percent strain on the object. A wrap angle of 20 degrees would yield a strain factor of 0.33, which would translate to a strain of 3.3 percent and would break or damage the fiber. The preferred wrap angle could be slightly higher (about 35 degrees) to more nearly null out the applied strain on the fiber (m=0) when very high axial strains on the tubular object (on the order of 10 percent) are expected and when the intent is to measure buckling rather than axial strain. The dashed line in FIG. 15 shows the nm shift on the right hand axis.

Figure 16:
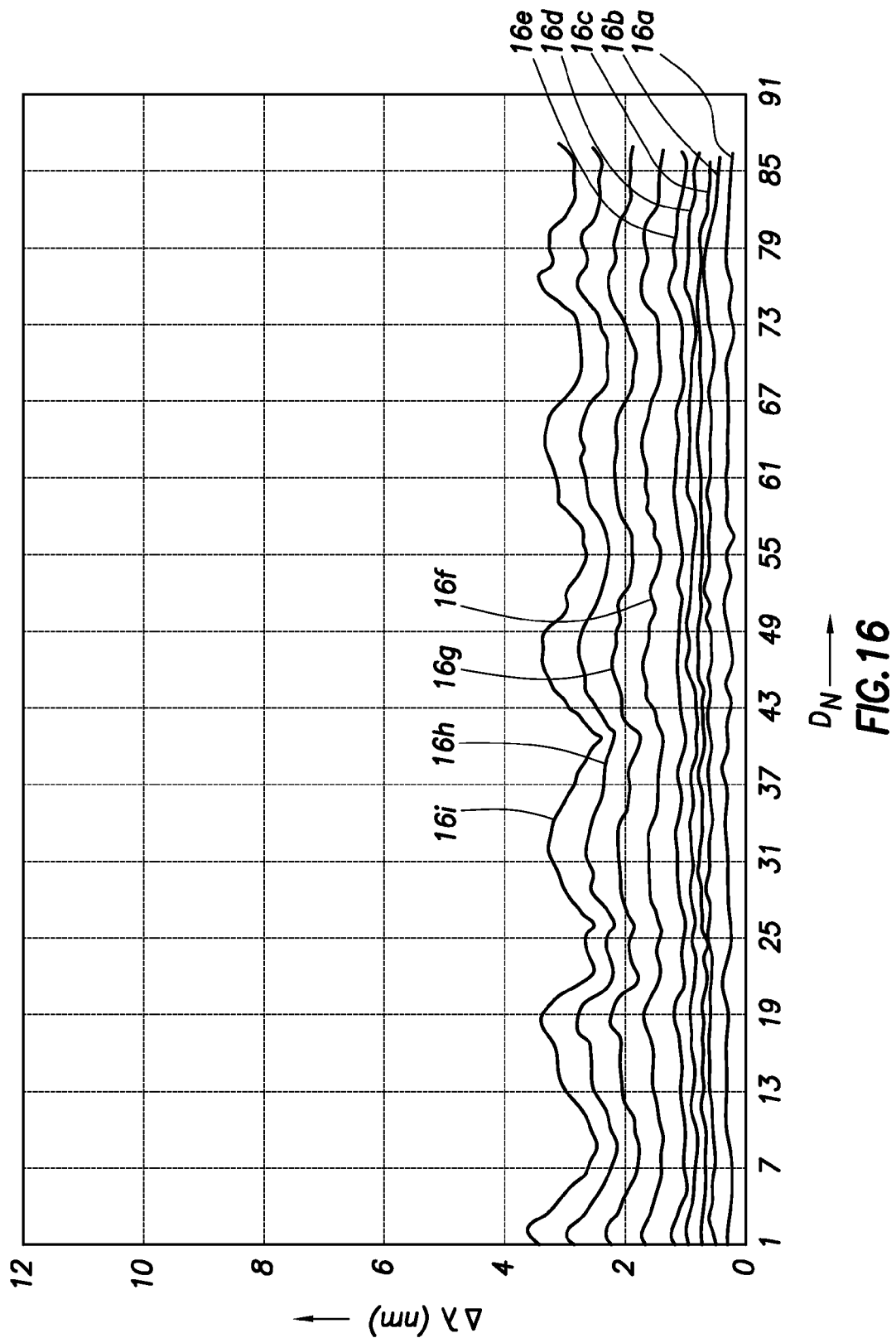
FIG. 16 is a graph illustrating the wavelength shift (Δλ) plotted versus grating number ($D_N$) for various levels of applied axial strain.

FIG. 16, illustrates the wavelength shift ($\Delta\lambda$, in nm) for various levels of pure applied axial strain (compression) on the same tubular object, plotted versus the grating number ($D_N$). In FIG. 16, the lines and their associated axial strains are identified as follows: 16a=0.1% axial strain; 16b=0.2% axial strain; 16c=0.3% axial strain; 16d=0.4% axial strain; 16e=0.5% axial strain; 16f=0.75% axial strain; 16g=1.0% axial strain; 16h=1.25% axial strain; and 16i=1.5% axial strain. The signal at a 30-degree wrap angle is reduced from that of a 20-degree wrap angle, as described in reference to FIG. 15. The reduction in signal as a function of wrap angle thus, follows the form shown in FIG. 15 and the strain factor (m) equation described above.

A 30-degree wrap angle should easily accommodate and measure up to five percent axial strain while imparting only a fraction of that strain to the fiber. As the axial strain increases, the onset of buckling and other higher modes of deformation are revealed by the periodic nature of the wavelength response.

Figure 17:
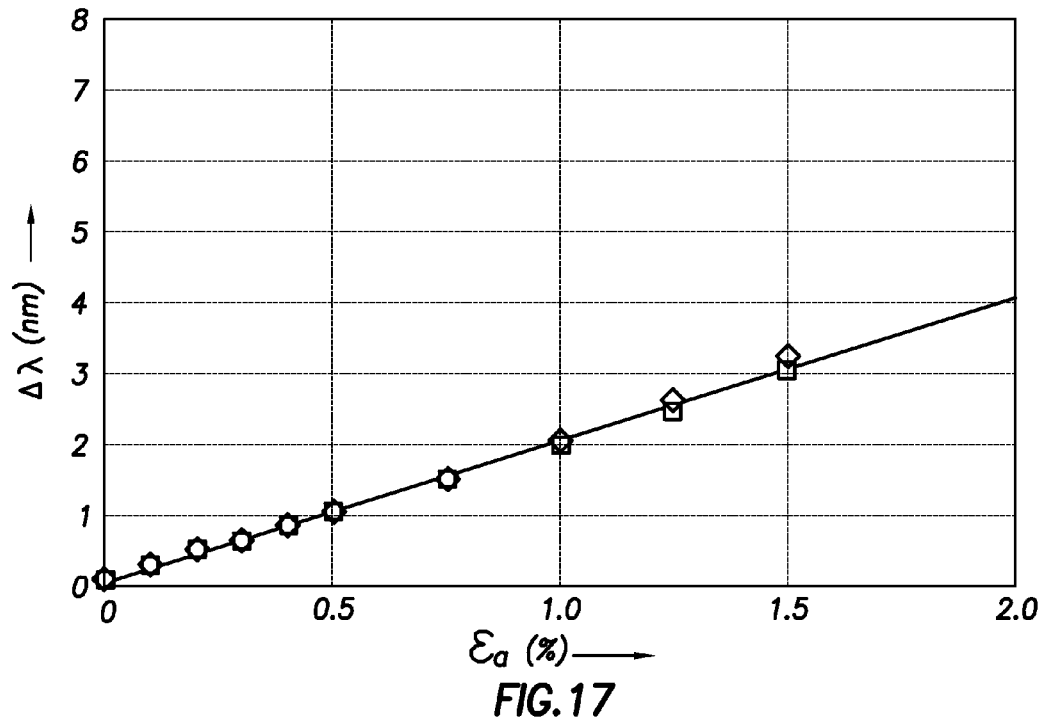
FIG. 17 is a graph comparing the average, peak and root-mean-square (rms) wavelength response with calculated or expected wavelength response, plotted as wavelength shift Δλ (nm) versus the axial strain applied $\epsilon_a$ (%)

Even though FIG. 16 reveals the onset of tubular buckling, the overall wavelength response remains substantially linear as axial strain increases. This concept is further illustrated in FIG. 17, which compares the average (□), the peak (♦) and the root-mean-square (rms) (X) wavelength response $\Delta\lambda$ with the calculated (—) or expected wavelength response at various levels of applied axial strain $\epsilon_a$. At about 1.5 percent axial strain, the peak reading begins to diverge slightly from a linear response as the structural material begins to slightly buckle.

One of the most sensitive areas in a well to compaction and deformation is the completion zone. This is particularly true in highly compacting unconsolidated formations in which sand control is required.

In order to control formation areas comprising sand, the base pipe is usually fitted with a filter, commonly referred to as a sand screen. A gravel pack (carefully sized sand) may also be used between the sand screen and the outer casing or formation. The sand screen may comprise a conventional sand screen wire wrap and multiple other conventional screen components (hereinafter referred to as a screen assembly). The wire wrap in the screen assembly is designed to allow fluid to flow through openings that are small enough to exclude large particles.

High axial strain imposed on the base pipe can close the wire wrap openings and impair fluid flow. Bends or buckles in the base pipe may also compromise the structural integrity of the screen assembly, thereby causing a loss of sand control. In this event, the well must be shut in until repairs can be made. Such failures require, at a minimum, a work over of the well and in extreme cases, a complete redrill. Consequently, monitoring the object for bends, buckles and axial strain in the completion zone is preferred-particularly where sand control is required. Accordingly, the strain sensors may be applied to the base pipe and/or screen assembly at about a 20-degree wrap angle.

EXAMPLE 7

Figure 18:
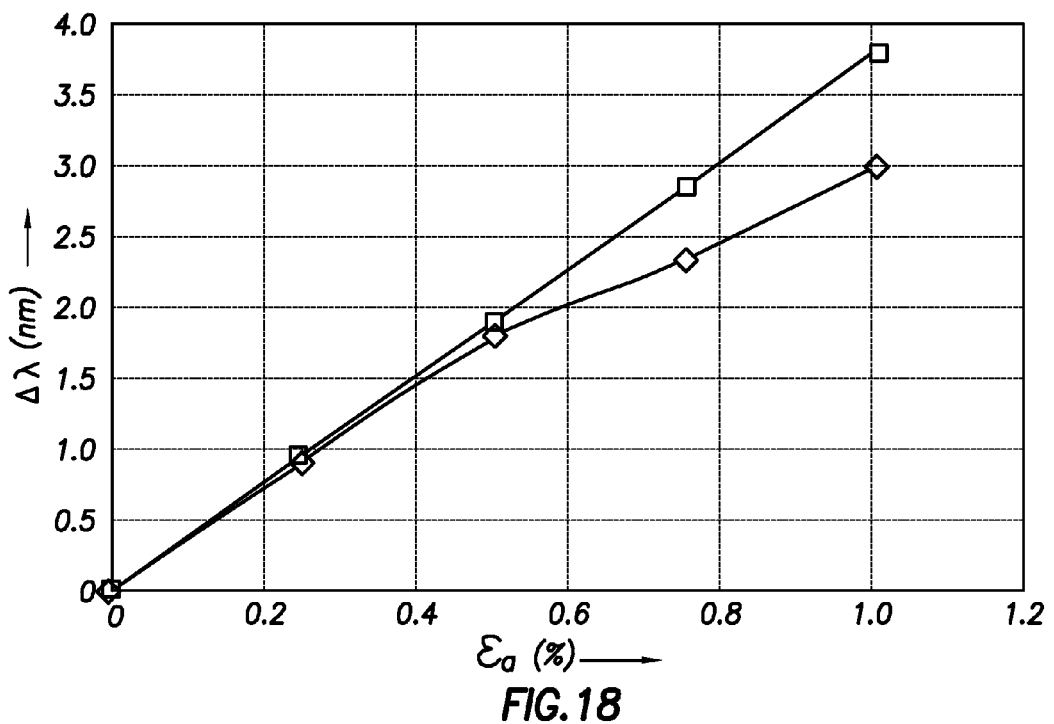
FIG. 18 is a graph illustrating the average wavelength shift Δλ (actual) over the applied strain sensors at each level of applied axial strain $\epsilon_a$ (%), compared to the calculated wavelength shift.

In this example, a 914-millimeter (36-inch) tubular object having about a 76-millimeter (3-inch) diameter and a Poisson ratio ($\nu$) of about 0.5, was tested in a controlled environment using a 21-degree wrap angle for the application of the strain sensors and fiber. Various amounts of axial strain $\epsilon_a$ were applied at each end of the object, which was otherwise unsupported. The average wavelength response (actual, ♦) over the applied strain sensors at each level of applied axial strain is compared to the calculated wavelength (□) response in FIG. 18. At about 0.05 percent strain, there is a departure from the linear calculated wavelength response suggesting a bend or a buckle is beginning to form in the object tested.

Figure 19:
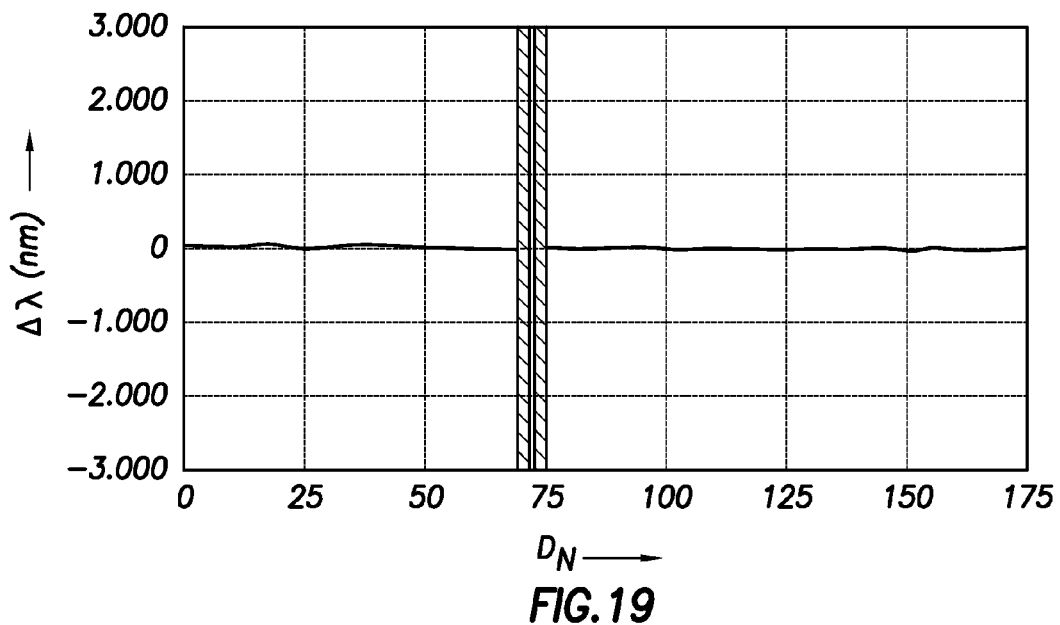
FIG. 19 is a graph of wavelength shift Δλ (nm) versus grating number ($D_N$), illustrating an axial strain of about zero.
Figure 20:
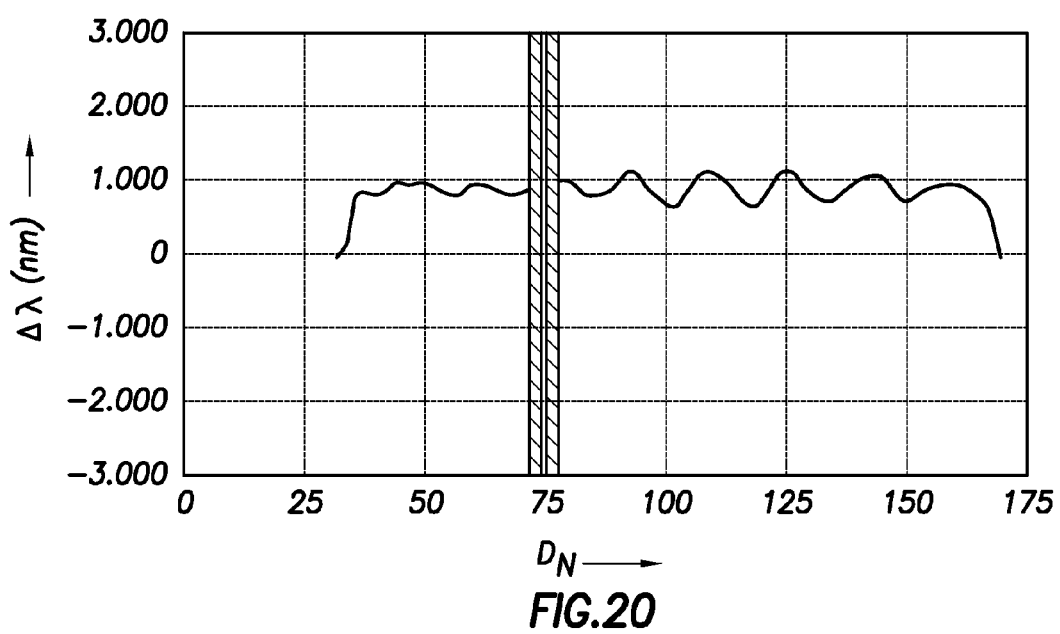
FIG. 20 is a graph of wavelength shift Δλ (nm) versus grating number ($D_N$), illustrating an applied axial strain of 0.25 percent.
Figure 21:
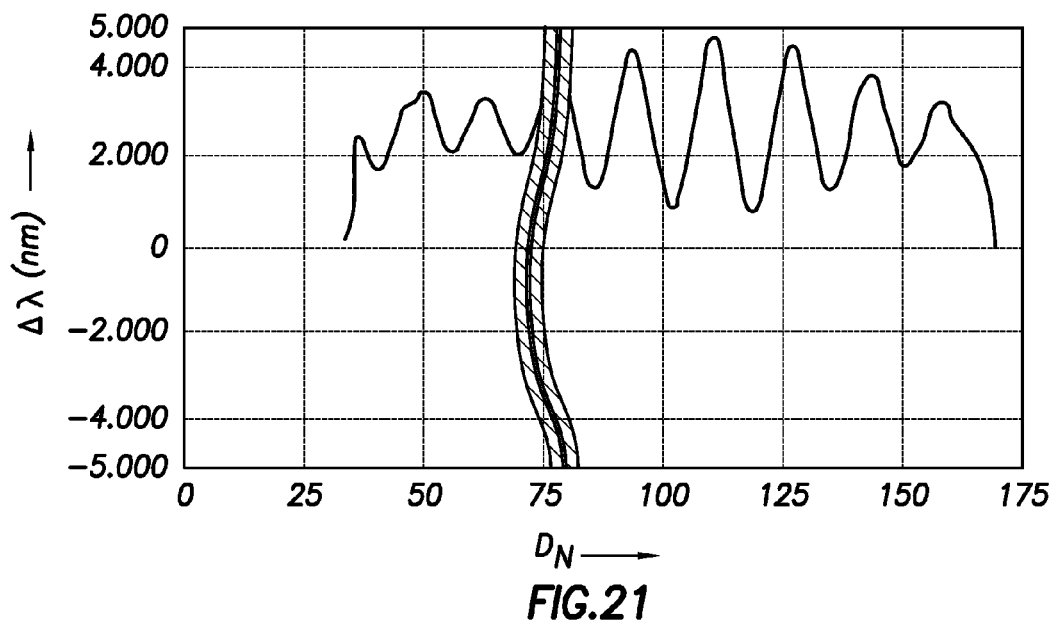
FIG. 21 is a graph of wavelength shift Δλ (nm) versus grating number ($D_N$), illustrating an applied axial strain of 0.75 percent.

The following Figures (FIGS. 19, 20 and 21) progressively illustrate why a departure from the calculated wavelength response occurs and how it can be used with a periodic signal to detect and determine the magnitude of the bend or buckle in the same object tested. For convenience, a vertical representation of the tubular object, as it reacts to the applied axial strain, is illustrated (in black) in the middle of FIGS. 19, 20 and 21. In FIGS. 19, 20 and 21, wavelength shift $\Delta\lambda$ (nm) is plotted against grating number ($D_N$). In FIG. 19, the applied axial strain is nominal or about zero.

In FIG. 20, applied axial strain is 0.25 percent. In FIG. 21, the applied axial strain is increased to 0.75 percent. In FIG.

20, the wavelength response illustrates the applied strain, however, there is no apparent deformation in the object.

In FIG. 21, the wavelength response is noticeably greater than the wavelength response in FIG. 20, and there appears to be a bend or a buckle in the object. As the axial strain applied to each end of the object increases, the object is compressed, which causes deformation in the form of a bend or a buckle.

FIG. 22 represents a simple illustration of pure axial strain (force) applied to the object 10. Here, the object 10 is subjected to an axial force 520. The wavelength response 530, representing strain on the object 10 measured by the strain sensors 20, associated with the axial force 520 is substantially constant as illustrated in FIG. 22A. Thus, the axial force 520 causes the object 10 to shorten or compress and expand in the direction indicated by the arrows 510. As a result, the wavelength response 530 is substantially constant until the object 10 begins to deform in the shape of a bend or a buckle as demonstrated by the progressive illustration in FIGS. 19, 20 and 21, above.

Figure 23:
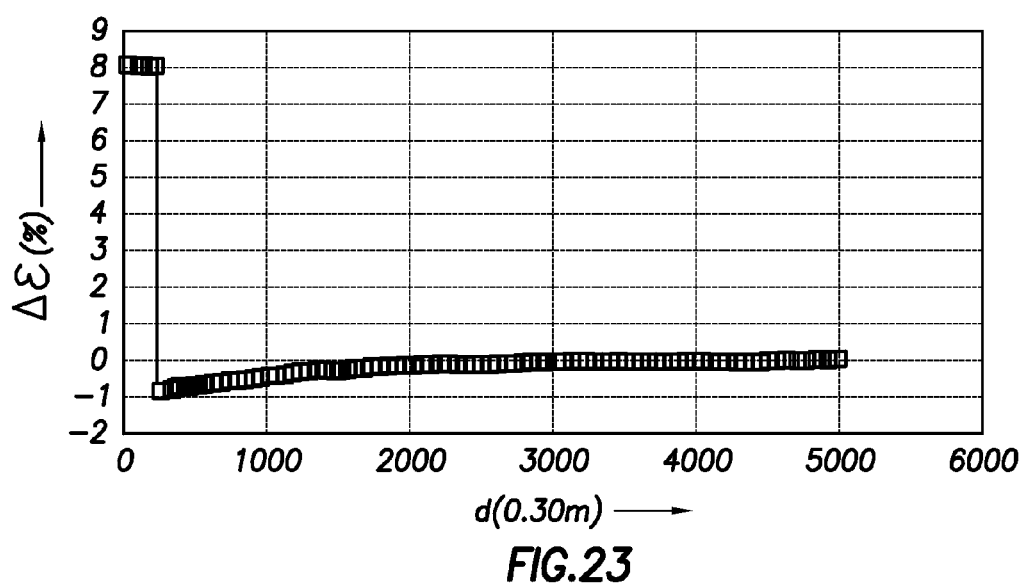
FIG. 23 is a theoretical plot of delta strain Δε versus distance (d) along a line above a reservoir.

One of the areas in the well where the least amount of strain is likely to occur in compacting reservoirs is in the overburden. The highest tensile strains are usually observed very near the compacting zone and the magnitude of the strain reduces as the distance from the compacting zone increases. This is reflected in the theoretical plot in FIG. 23, plotting delta strain ($\Delta\epsilon$) versus the distance (d) along the line (in feet) as Delta $S_{ext}$ ZZ (*), wherein the reservoir is undergoing 8.0 percent compaction strain and the maximum extensional strain in the overburden is 1.0 percent.

The actual magnitude of the extensional strain in the overburden just above the reservoir is highly dependent upon the reservoir geometry and the material properties of the reservoir and overburden. The ratio of the extensional strain just above the reservoir to the compressional strain in the reservoir can be used as one diagnostic for reservoir performance. Likewise, the amount of a tensional strain in the overburden affects such things as seismic signals used for 4D seismic measurements. Thus, the fiber and strain sensors are preferably applied at about 90 degrees longitudinally along the object to increase sensitivity to tensile strains. When the fiber and strain sensors are positioned on a tubular object specifically designed for monitoring such strain, a very accurate measurement can be made.

Furthermore, three or more fibers containing strain sensors may be longitudinally and equidistantly positioned around the tubular object in order to detect not only axial strain on the object but also bending strain. The strain on the outside of the radius of curvature of the bend or buckle will be higher (in tension) than the strain on the inside radius. Thus, when 3 or more fibers containing strain sensors are positioned in this manner, the detection and measurement of a long radius bend is possible through the uneven wavelength response.

Figure 24:
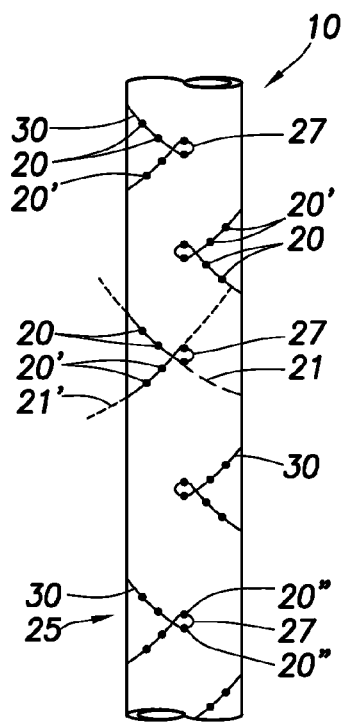
FIG. 24 is an elevational view of a cylindrical object illustrating a plurality of sensors or transducers applied to the object in a zig-zag pattern.
Figure 24A:
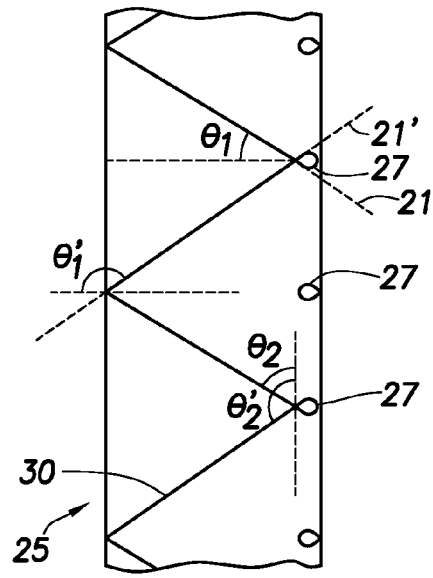
FIG. 24A is a cylindrical projection view the cylindrical object of FIG. 24.

Applying the string of sensors to the cylindrical object at the preferred wrap angle is not limited to actually spiraling the string around the object such as is exemplified in FIG. 1. As illustrated in FIGS. 24 and 24A, the string, in the form of an optical fiber 30, of strain sensors, preferably of the FBG-type, has been applied on the cylindrical object 10 in a selected zig-zag pattern 25. Here, FIG. 24 shows a perspective view of the object 10 with the optical fiber 30, while FIG. 24A shows a cylindrical projection thereof. It is remarked that for reasons of clarity, the strain sensors have not been explicitly indicated in FIG. 24A, nor in the remaining FIGS. 25 to 31.

The zig-zag pattern comprises first and second application lines, schematically represented in FIG. 24 by dashed lines 21 and 21', respectively. A first portion 20 of the strain sensors is applied along the first application line 21 and a second portion 20' of the strain sensors is applied along the second application line 21'. As best viewed in FIG. 24A, the first application line 21 extends on the exterior surface of the cylindrical object 10 at a first preferred wrap angle $\theta_1$ within a preferred first wrap angle range that lies between 0 and 90° from an imaginary line perpendicular to the longitudinal axis. The second application line 21' extends at a second preferred wrap angle $\theta_1'$ within a preferred second wrap angle range that lies between 90 and 180°. The angles 0°, 90°, and 180° are excluded from the first and second wrap angle ranges.

As explained above, the preferred first wrap angle may also be represented by $\theta_2=90°-\theta_1$ to represent the angle with the longitudinal axis. Likewise, the preferred second wrap angle be represented relative to the longitudinal axis as $\theta_2'=90°-\theta_1'$.

The preferred first and second wrap angles may be determined as described above, and may be based on first and/or second strain factors.

The preferred second wrap angle may be chosen equal to 180° minus the first preferred wrap angle, resulting in a zig-zag pattern of two constant helicities of opposite parity. However, the zig-zag pattern allows for two distinct wrap angles corresponding to different strain factors.

The zig-zag pattern moreover allows for easy application of the string of strain sensors without the need of continuously wrapping.

As depicted in FIGS. 24 and 24A, the optical fiber, between the first portion 20 of the strain sensors and the second portion 21' of the strain sensors, makes a loop 27 over a loop angle of more than 180°. This allows for an effectively sharp zig-zag pattern without having to bend the optical fiber too much. A minimum bend radius, specified for the fiber, may be maintained.

When the loop angle equals 180° plus the included angle between the first application line and the second application line, the string of strain sensors can enter and exit the loop in directions along the respective application lines.

This loop is preferably mechanically decoupled, or at least strain-isolated from the object, such that the fiber in the loop is not significantly strained due to deformation of the object. When the loop moreover comprises a third portion 20" of the strain sensors, the signal from such free loops 27 provides a calibration point in the signal image because the signal originating from the third portion 20" of strain sensors is not significantly subject to deformation strain caused by the object 10. In fact, the free loops 27 allow for an integral temperature measurement because the signal originating from the third portion 20" of the strain sensors is predominantly governed by temperature changes. Such temperature measurement may be used to separate a contribution in the signal from the first and second portions of the strain sensors of deformation of the object from a temperature effect the signal.

As explained above, the string of strain sensors may be applied to the object in at least one of a protective sheath and a protective sheet.

Figure 25:
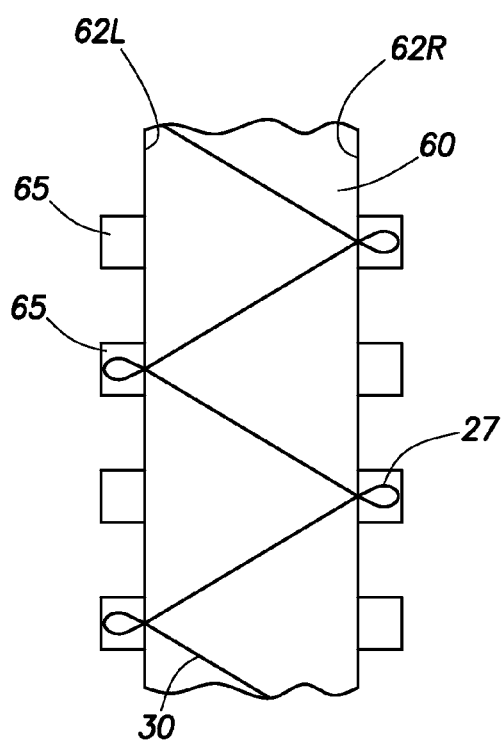
FIG. 25 schematically shows a view of a pliable support structure.
Figure 26:
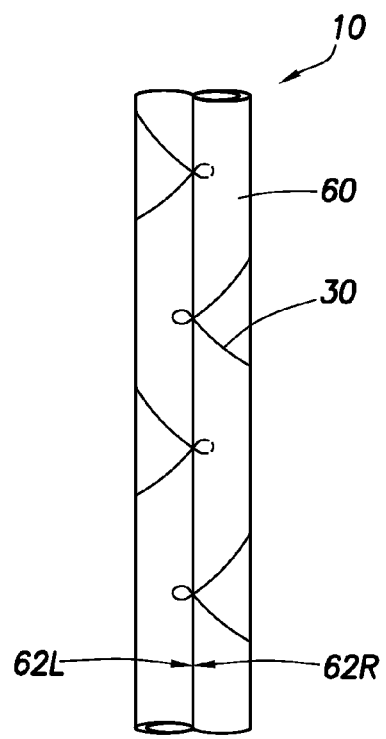
FIG. 26 shows a perspective view of a cylindrical object having the pliable support structure of FIG. 25 draped around it.

The string of strain sensors may be mechanically coupled, in the selected zig-zag pattern, to a pliable support structure 60, as schematically depicted in FIGS. 25 and 26. FIG. 25 shows an elevated view of the pliable support structure 60 with the string of strain sensors in the form of an optical fiber 30 with FBG type sensors (not shown). In the embodiment as depicted, the free loops 27 reach beyond the longitudinal edges 62L and 62R of the pliable support structure 60. These loops may be protected by protective covers 65, which may be provided in the form of protective sheets, bands, layers, tabs, etc.

The pliable support structure 60 is capable of being draped around the cylindrical object 10. FIG. 26 shows the cylindrical object 10 with the pliable support structure 60 draped around it. The longitudinal edges 62L and 62R are shown abutted against each other in longitudinal direction relative to the cylindrical object. Of course, the seam line formed by the edges may be straight or corrugated, and may abut, overlap or leave a gap between them when draped around the object 10. The seam may run in a generally longitudinal direction such that the pliable support structure is easily draped around the cylindrical object without the need of wrapping it around the object.

The selected zig-zag pattern of the string of strain sensors on the pliable support structure may comprise first and second application lines extending in mutually differing directions defining an included angle between the first and second application lines of less than 180°. The application lines each extend in an essentially straight fashion within the plane of the support structure. When draped around the object, the application lines then follow the curvature of the object in an otherwise straight line. A first portion of the strain sensors is mechanically coupled to the pliable support structure along the first application line and a second portion of the strain sensors is mechanically coupled to the pliable support structure along the second application line.

The fiber 30 has been visibly depicted in FIG. 26 to enhance the understanding. However, the fiber 30 is not necessarily on the exterior surface of the pliable support structure when draped around the object 10. The fiber 30 may be sandwiched between the pliable support structure and the object, or it may for instance be sandwiched inside exterior layers of the pliable support structure, or it may for instance be buried within a single layer of the pliable support structure. The fiber may be located in a conduit such as is described in embodiments above. The fiber may also be integral to the pliable support structure.

Once draped around the cylindrical object, the pliable support structure may be held in place in any suitable way, including one or more of a zipper, straps, clamps, adhesive, Velcro®, or combinations of such means.

In a first group of embodiments, the pliable support structure may be made of a generally compliant material, such as a cloth, a blanket, a sheet, a fabric. A fabric may be woven from strands, including strands comprising metal wires and/or epoxy fiber glass combined with an elastomer such as comprising a butyl rubber. A cloth may be formed of a metallic cloth. A sheet may comprise a rubber sheet.

The pliable support structure may be more compliant than the material of the cylindrical object around which it is to be draped.

This group of embodiments may be stored on a spool 70, such as is depicted in FIG. 27. In this figure, a number of pliable support structures (60A, 60B, 60C, etc.) have been combined on a continuous protective cover 66 to facilitate the application of the pliable support structures to one or more cylindrical objects as well as to protect the connecting optical fiber 30 between neighboring pliable support structures and/or the free loops 27.

The spool 70 may be transported to a rig site, and used to facilitate the act of draping of the pliable support structures around a tubular object, such as for instance a casing 10, while it is suspended in the rig. One of the pliable support structures may paid out from the spool 70, separated from the protective cover 66, and positioned against the tubular object 10 between two joints. Subsequently, it may be draped around the tubular object 10 and fastened to it. Protective rings, such as centralizers or clamps shown in FIG. 28 at 80, may be provided over the joints and/or collars to protect the fiber cable passing from one support structure (e.g. 60B) to a next support structure (e.g. 60C).

The fiber 30 may be a continuous fiber, or it may be provided with fiber connectors, preferably "dry-mate" type fiber optic connectors, between subsequent pliable support structures on the spool. In the case of the latter, the fiber connectors may suitably be connected before applying the protective rings 80 so that the connectors may also be protected underneath the protective rings.

It will be appreciated that the application of a string of strain sensors employing the pliable support structure, as described here, in particular in a rig site environment, is beneficial not only to strings of strain sensors arranged in a zig-zag pattern but to strings laid out in any pattern, including longitudinal strings of sensors and/or axially aligned strings of sensors or generally meandering strings of sensors.

A test was performed of the first group of embodiments. A sensing fiber provided with FBG-type strain sensors was first taped onto a large sheet of paper in a zig-zag pattern of which the application lines ran 20° from the horizontal, thus resulting in first and second wrap angles of 20° and 160°. Loops were provided at the extremum points at the transitions between the first and second wrap angles. The width of the paper (horizontal dimension) was chosen such that it drapes around a polyurethane rod of 5 cm (2 inch) diameter leaving a tiny axial gap of less than 3 mm (less than ⅛ inch) between the edges. After taping the fiber in place, the sheet was sprayed with a coat of polyurethane spray. Then a sheet of wax paper was pressed with the wax side down onto the wet paper surface to ensure that the fiber was tightly coupled to the sheet and stays in place. Essentially, the bare fiber was sandwiched in between the two sheets and held at the specified first and second wrap angles by the polyurethane spray. This allows the fiber to sense any strain applied on the sheet. The sheet of paper was then wrapped around the polyurethane rod and taped together across the gap employing circumferential tape bands at various intervals around the axial length of the object.

Figure 30A:
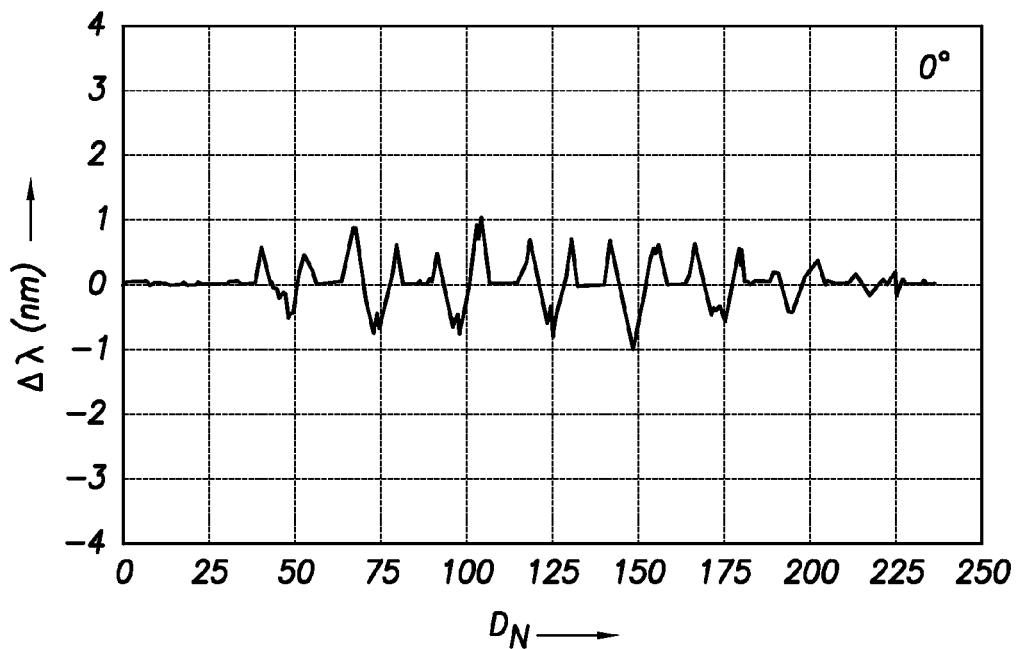
FIG. 30 (parts A to I) show measured wavelength shift (Δλ) versus grating number ($D_N$) of the rod-system of FIG. 29 in horizontal positions under various azimutal orientations.
Figure 30B:
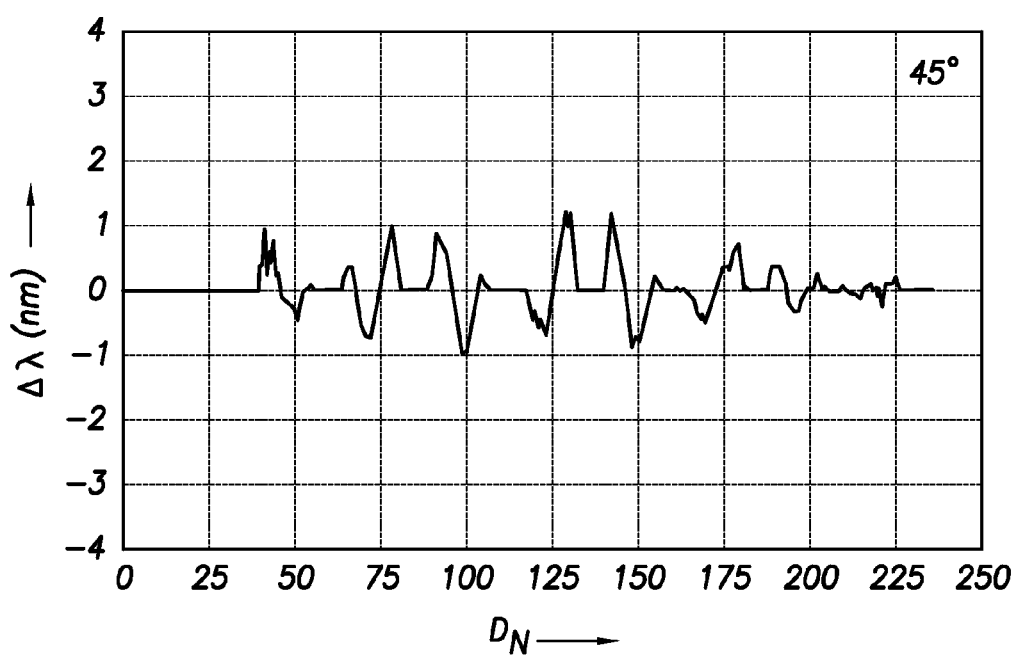
Figure 30C:
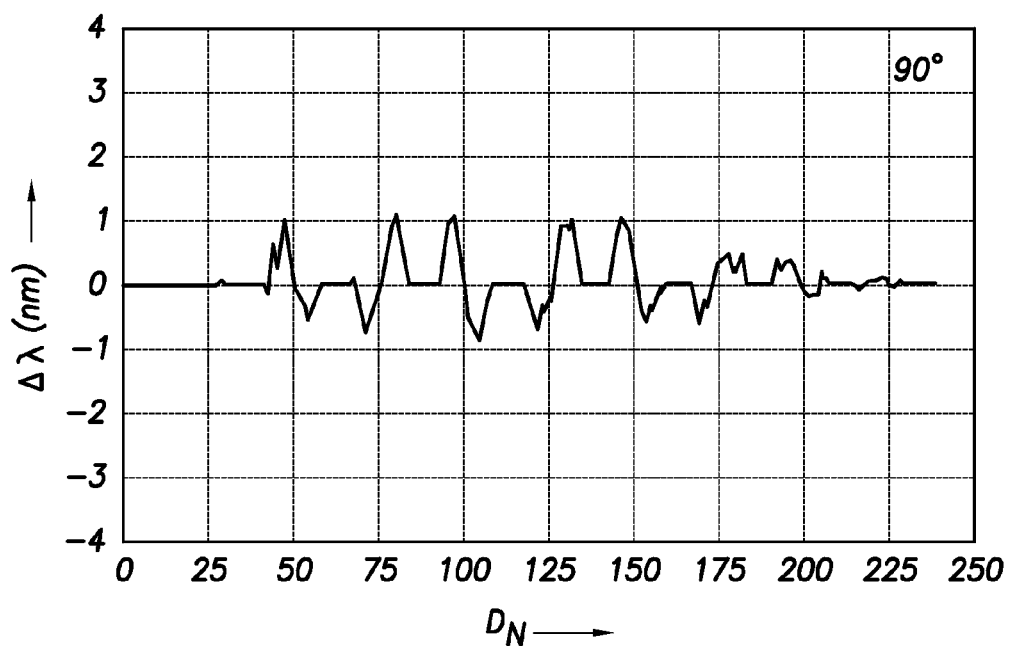
Figure 30D:
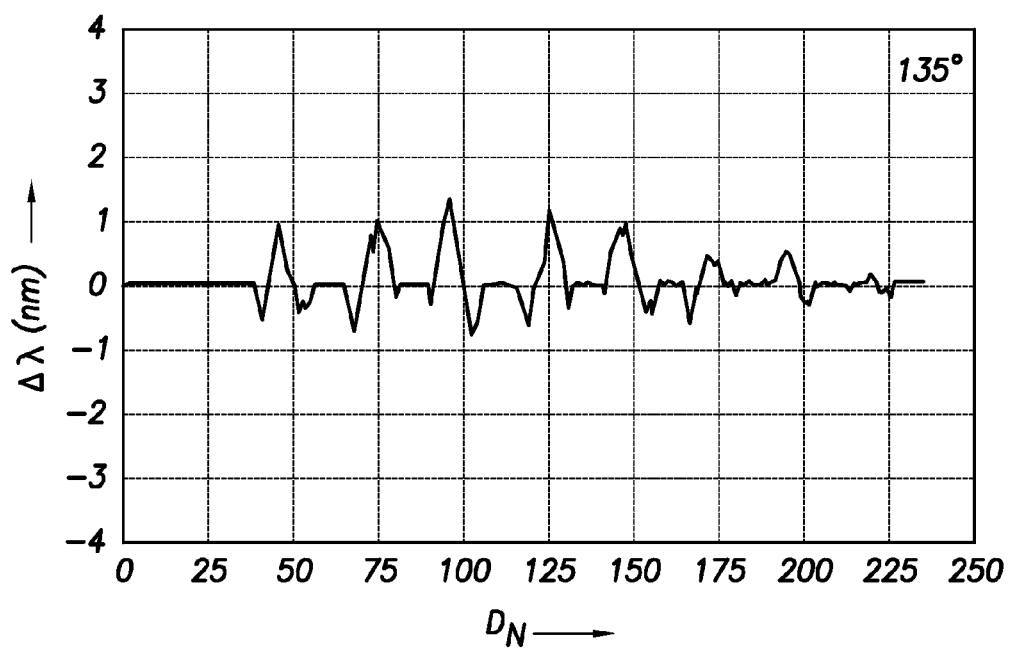
Figure 30E:
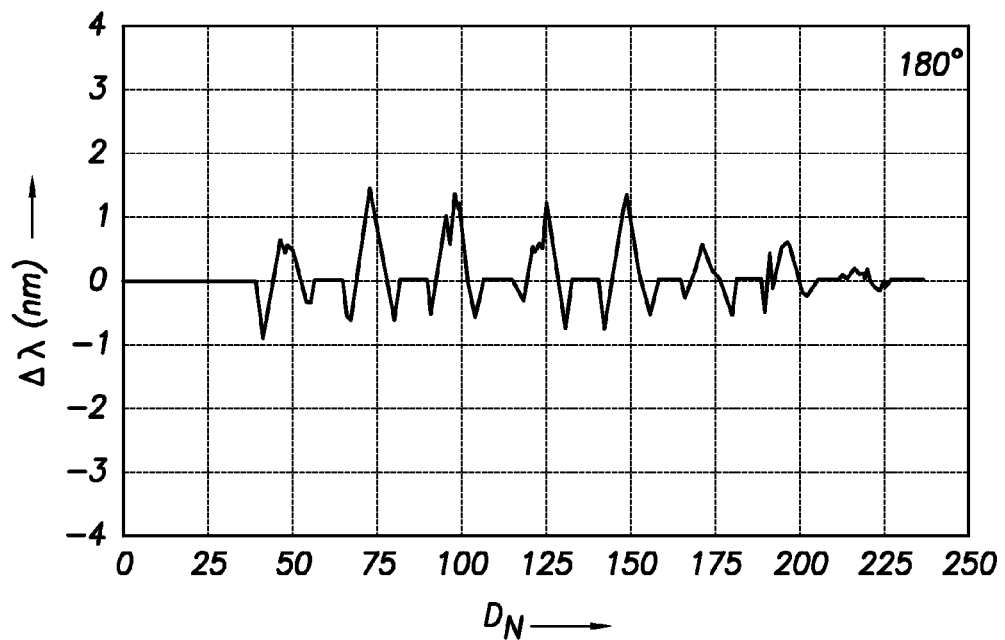
Figure 30F:
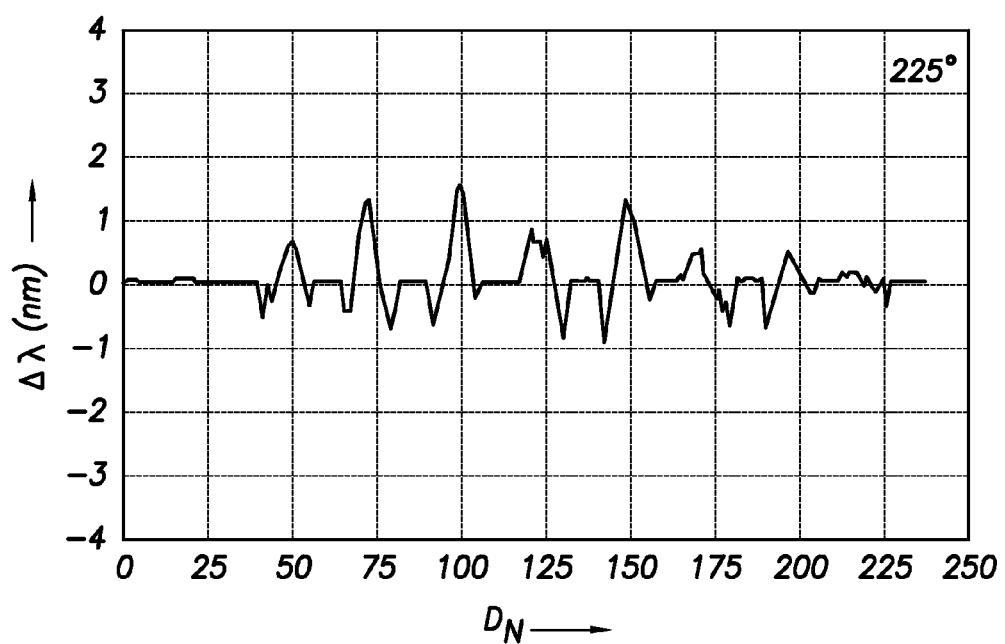
Figure 30G:
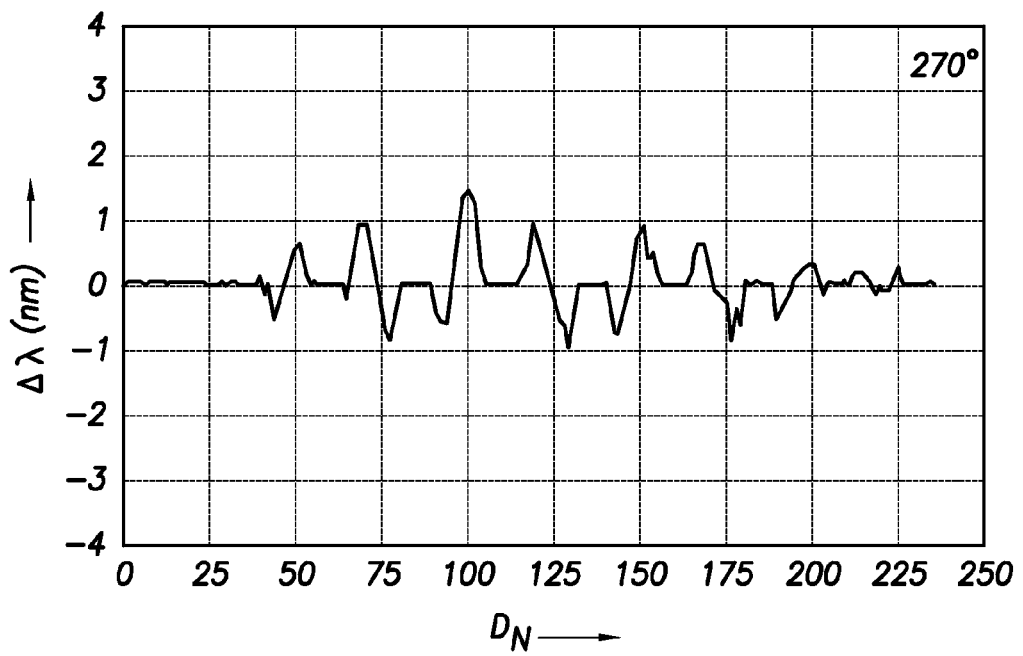
Figure 30H:
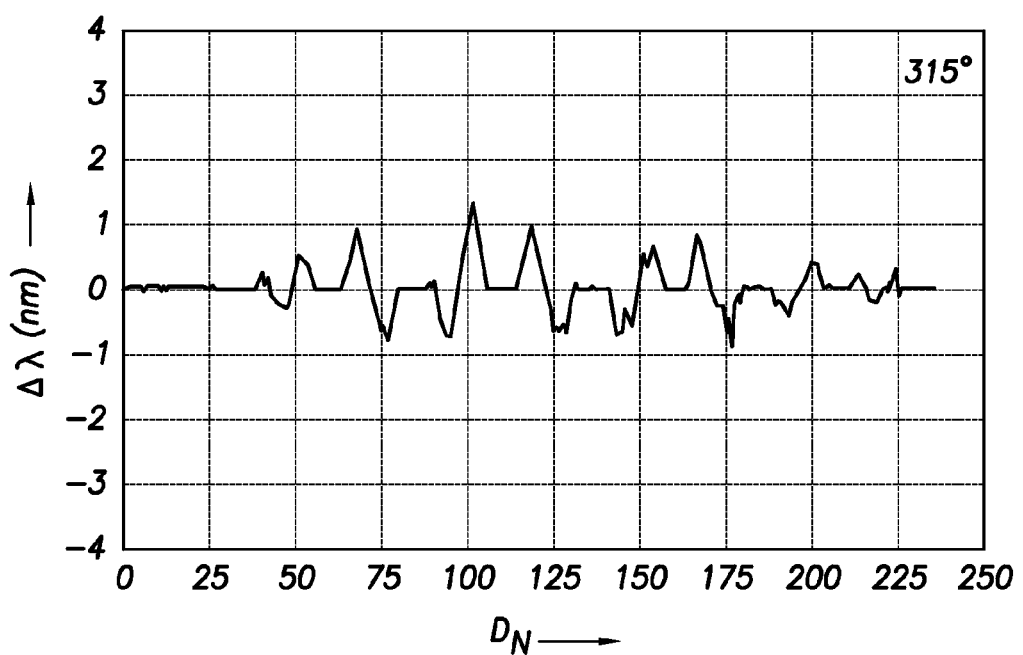

The rod was first held in an upright vertical position and the measured wavelength shift ($\Delta\lambda$) measured at each FBG-type strain sensor. FIG. 29 shows the result, representing the $\Delta\lambda$ against grating number $D_N$ when no strain is present. Then the rod was placed between two v-grooves allowing the rod to sag under its own weight. The axial gap between the paper's edges was facing vertically upward, and the wavelength shift signals were measured as shown in FIG. 30A. Then the rod was rotated over 45° about its longitudinal axis, such that the gap was oriented 45° from the vertical, and the wavelength shift signals were measured again as shown in FIG. 30B. This was repeated, and the successive measurements at 45° intervals are shown in the remaining FIGS. 30C to I, whereby in FIG. 1 the gap was again in its upward facing starting position. The signals essentially show a sequence of sinusoidal patterns separated by parts showing no wavelength shift. The parts showing no wavelength shift originate from sensors that were mechanically decoupled from the rod, in loops at the extrema of the zig-zag pattern. These are not sensitive to strain in the rod. After every loop, the sign of the sinusoidal pattern inverts because the "zag" at the second wrap angle reverses the spiral orientation of the fiber compared to the "zig" at the first wrap angle. Thus, the full sinusoidal pattern can be reconstructed by sign-inverting every second part of the measured pattern, as will be explained in more detail below with reference to FIG. 32.

Figure 30I:
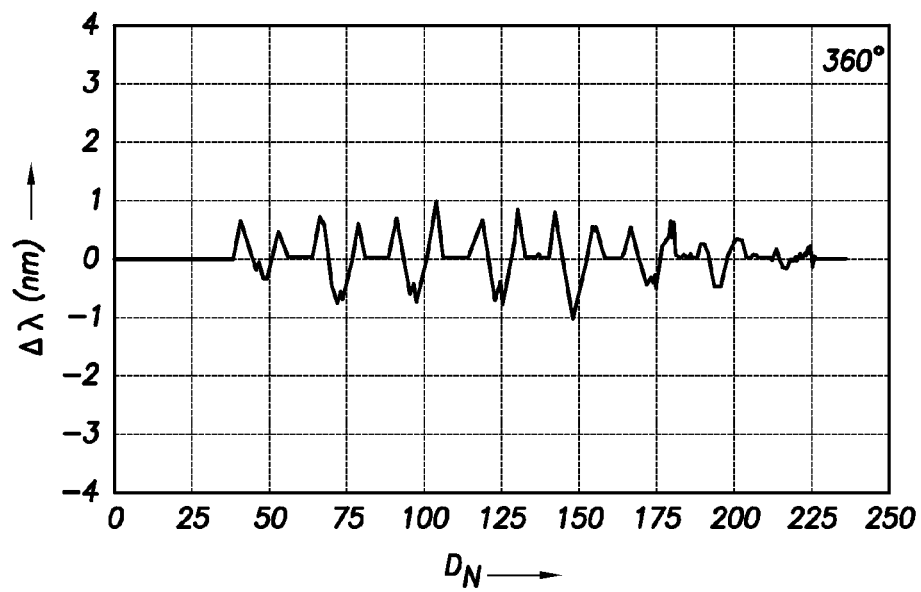

The signal of FIG. 30I is remarkably similar to the signal of FIG. 30A, showing that reproducible signals are obtained without having to glue the paper to the rod. The bends are picked up repeatably with only circumferencially holding the paper in place.

Figures 31A, 31B:
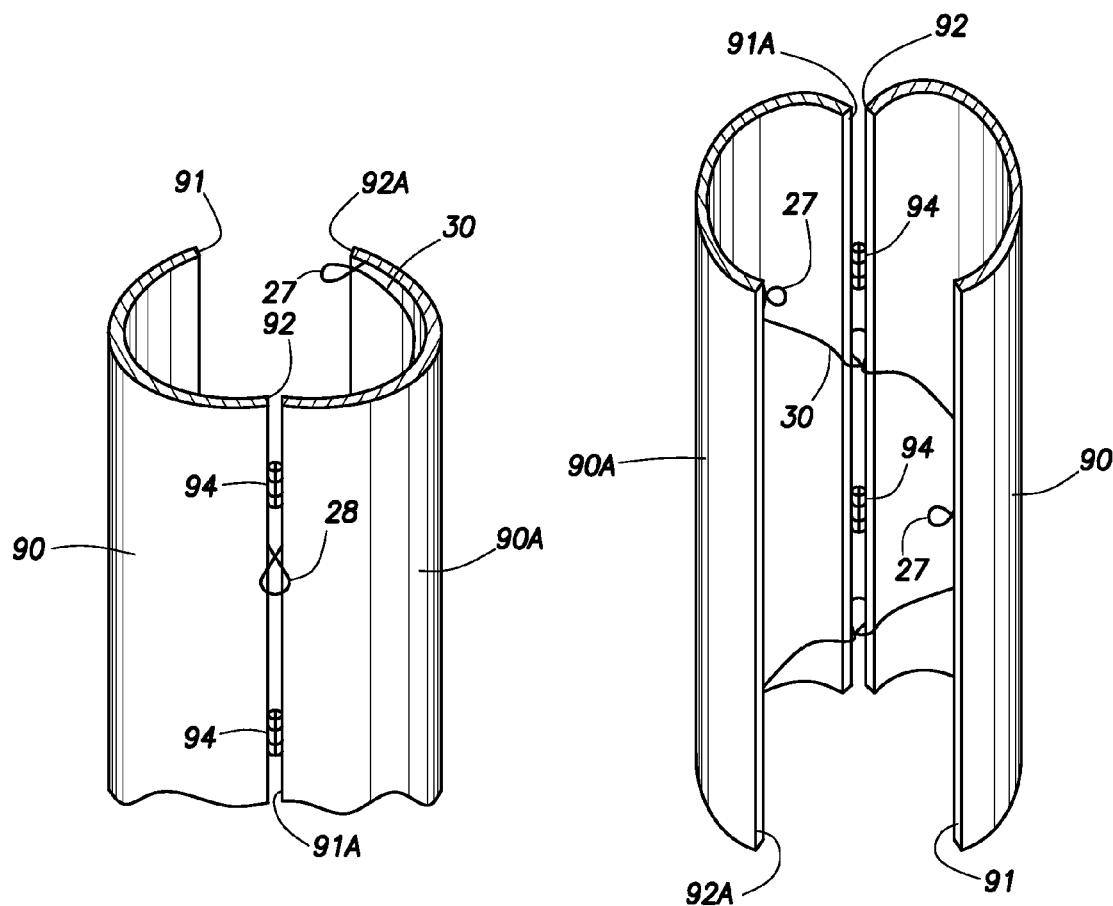
FIG. 31A schematically shows a perspective view of a pliable support structure in the form of a clamshell structure.
FIG. 31B schematically shows another perspective view of the same clamshell structure as depicted in FIG. 31A.

In a second group of embodiments, the pliable support structure is provided in the form of a clamshell structure. An example is shown in FIGS. 31A and 31B, where FIG. 31A shows on perspective view and FIG. 31B shows another perspective view. Such a clamshell structure may comprise at least first and second shell parts comprising cylindrical sections 90, 90A each having a concave interior and a convex exterior surface, each having left (91 respectively 91A) and right longitudinal edges (92, 92A). The shell parts are hinged one to another along two longitudinal edges, for instance the right edge 91A of the cylindrical section 90A with the left edge 92 of the cylindrical section 90. The hinges 94 allow for a pivotable rotation of one cylindrical section 90 relative to the other cylindrical section 90A about the longitudinal axis.

The first and second shell parts may be relatively rigid, whereby the pivotable rotatability provides pliability to the clamshell structure. "Pliability" may also be achieved by providing two or more separate clam shell parts that are connected to one another after draping them around the cylindrical object, for instance by means of a latching mechanism or by means of bands binding the clam shell parts in place. The zig-zag pattern of the string of sensors in one of the shell parts could match or complement that of the pattern in the other of the shell parts.

The fiber 30 has been depicted as mechanically coupled to the concave surface of the shell parts, with free loops 27 extending beyond the edges 91 and 92A which mark the extrema or turning points of the zig-zag pattern.

Free loops 28 are also provided at the hinged edges 91A and 92 to allow flexibility facilitating the rotational movement of the shell parts. Similar to the first group of embodiments, each or any of the free loops 28 may be protected from impacts from the outside, by a protective cover.

The clamshell structures may be draped around the tubular object depicted in FIG. 28. The clamshell structure is contemplated to be of particular relevance for draping around a screen assembly but it can also be of relevance of draping around several pipe elements joined in a pipe string. In any case, the shell parts may have an open structure such as to allow passage of fluid there through. Open structure may be provided by forming the clam shell parts from a perforated sheet or expanded metal sheet rather than a metal sheet. Similarly shaped polymeric or composite materials may also be employed.

FIG. 32 shows how a plurality of clam shell parts (90, 95, 100) may be stacked together prior to their draping around the pipe elements. In these embodiments, the strings of sensors are connected between the clam shell parts by means of a flexibly protected connective cable 96.

When draping these shell parts around the cylindrical object, a first shell part would be attached and subsequent adjoining shell parts would be fed off of the stack as they are draped around the cylindrical object. At a rigsite, the cylindrical object could gradually be lowered into the well as the next shell parts are being draped around. The draping may also occur simultaneously with making up the tubular joints in the slips.

The plurality of clam shell parts may be stacked in a holding box or rack that could be moved laterally and/or vertically, and/or rotated so as to feed the adjoining joints without damaging the interconnecting flexible cables 96.

FIG. 33 shows a variation of FIG. 32, wherein couples of pivotably hinged shell parts (90+90A; 95+95A) are stacked and connected via the flexibly protected connective cable 96.

FIG. 34 shows a schematic perspective view of clam shell parts 95 and 95A provided with a latching mechanism comprising brackets 97 and 97A mounted to the clam shell parts in close vicinity of the respective longitudinal edges 98 and 98A. The brackets 97 and 97A are provided with longitudinally aligned cylindrical bores 99 and 99A, through which a locking pin 101 may be inserted after the set of brackets of one of the clam shells have been longitudinally aligned with the set of brackets of the other.

It will be appreciated that the string of strain sensors may be mechanically coupled to the exterior convex surface of the clamshell structure, and it may also be sandwiched between an inner and an outer shell of each shell part. Such an inner and/or outer shell part may be formed by, for instance, a relatively thin and compliable protective sheet adhered to the other outer and/or inner shell part.

At least one of the clam shell parts may cover more than half a circle so that at least one free longitudinal edge of at least one of the shell parts overlaps the mating longitudinal edge of another adjacent shell part. Such overlap may be provided with a protective housing space to accommodate free loops.

It will also be appreciated that the clamshell structure may comprise three or more shell parts each hinged one to another to form a chain. Free loops 28 may be provided at each hinging edge.

In both groups of embodiments, the protective cover 65 may be part of a closure mechanism. For instance, the latching brackets 97 and 97A shown in FIG. 34 may be sized and positioned to accommodate the free loops 27 so as to be loose buffered, or strain free decoupled from the cylindrical object.

In one example schematically shown in FIG. 35, the brackets 97 are provided with a cavity 102 to form a housing for accommodating at least the free loops 27 of the string of sensors. The cavity 102 may be less deep than the thickness t of the brackets but deep enough for accommodating the string of sensors 30. The cavity may be of any suitable shape, including square, rectangular, polygon, oval, ellipsoid, circular or it may be shaped as a groove that accommodates the string of sensors 30. Such a cavity 102 may be formed in the brackets in any suitable manor, including by machining or molding.

Similarly, the free loops 27 may be accommodated in tabs or sheets as for instance shown at 65 in FIG. 25.

Such protective covers also protects the string of sensors against the cement if the cylindrical object concerns, for instance, a casing that is cemented into a well. Otherwise, the loops that are intended to be free loops may become mechanically coupled to the cement.

The above described application of the plurality of transducers in a zig-zag pattern may be employed in a method of imaging deformation of an object, as will now be illustrated with reference to FIG. 36. This Figure shows expected wavelength shift ($\Delta\lambda$) on a given strain sensor grating plotted, on the left vertical axis, against axial position (Z) of that strain sensor grating along a tubular object.

The tubular object had a diameter of 17.78 cm (7 inch) and a Poisson's ratio of 0.3, and the response of each sensor has been calculated from expected local bend radii at the sensor locations along the application lines of the sets of sensors, resulting from subjecting the tubular object to an S-bend. The local bend radii together form the S-bend as shown in line 33 in FIG. 36 against the right-hand axis which plots the center of the tubular object relative to the original axial position of the object. The object is offset by 24 cm (9.5 inches) over an axial length of 3.6 m (12 feet). Such an offset may in realistic circumstances occur across a boundary in the earth that is shearing, for instance across a fault or a horizontal slip layer.

The calculations were made in respect of a first set of optical strain sensor gratings spiral wrapped around the tubular object at a wrap angle of 20°, and in respect of a second set of optical strain sensor gratings draped around the tubular object under a zig-zag pattern employing first and second wrap angles of 20° and 160°.

Figure 36:
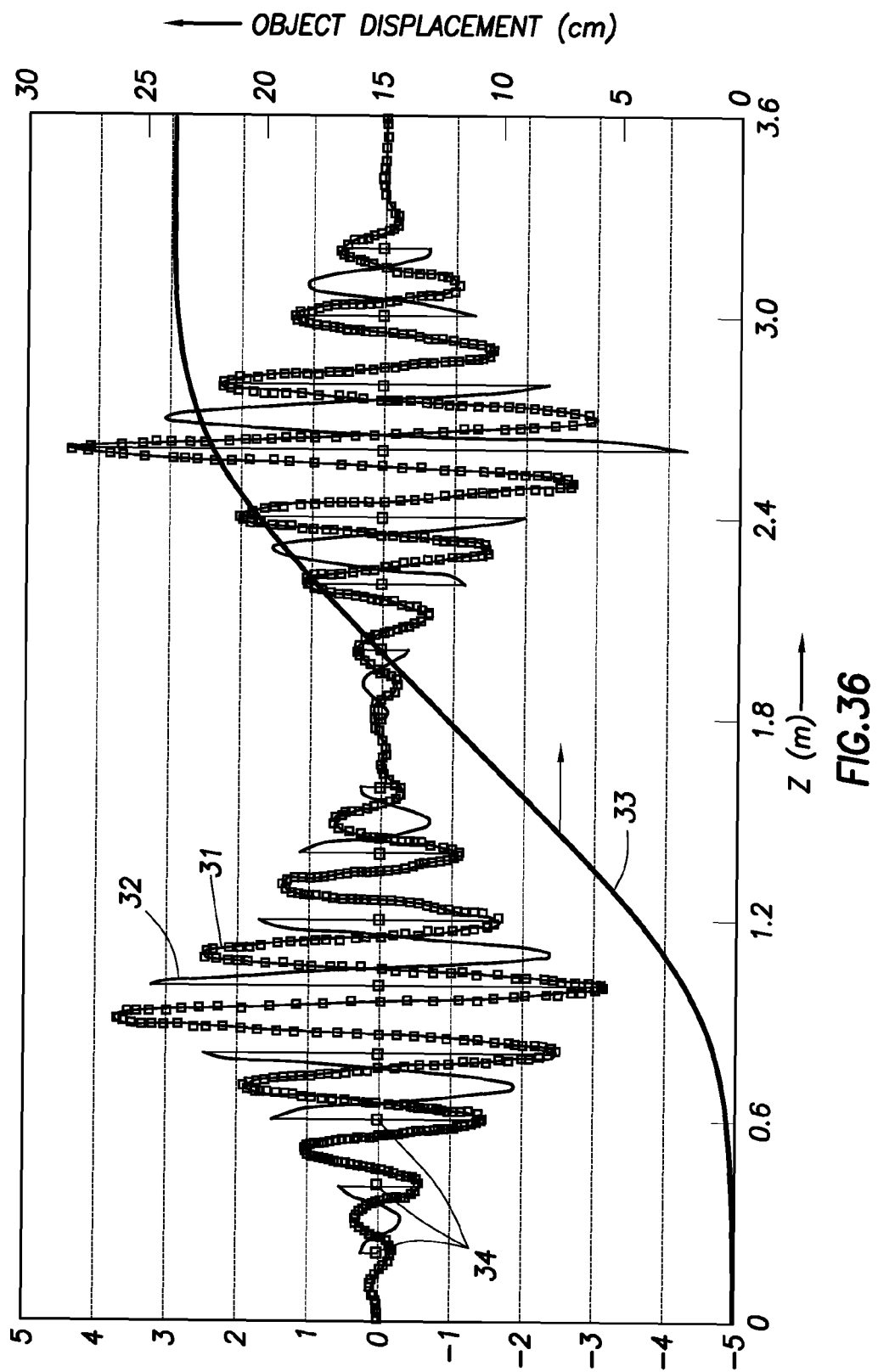
FIG. 36 compares sinusoidal patterns of a set of strain sensors wrapped around a tubular object with patterns of a set of strain sensors draped on the tubular object in a zig-zag pattern.

Line 31 in FIG. 36, with x-shaped data symbols, shows the expected wavelength shift response for each sensor in the first set. It shows a similar sinusoidal behavior as schematically illustrated in FIG. 7A. Line 32, in diamond marks, shows the expected wavelength response of each sensor in the second set. The first and second sets give identical responses when they have the same wrap angle on the structure. However, when the orientation of the zig-zag drape changes the sign of the wavelength shift signal reverses.

The signal from the square-marked strain sensors 34 originate from strain sensors in the loop parts of the second set, that are not mechanically coupled to the tubular object. They show zero wavelength shift, as they are not strained due to object deformation. Any wavelength shift associated in these strain sensors would be due to temperature and pressure effects and therefore can be used to adjust for such effects on the object. The loops also provide an orientation key that allow the direction of any bending in the object to be ascertained.

The present invention may be utilized to detect and monitor deformation of any substantially cylindrical object in a well bore caused by structural strain, regardless of the well bore or formation activity. As described herein, the present invention may be uniquely tailored to detect and measure axial compaction, shear, bending, buckling, and crushing (ovalization) induced strain on the well bore object due to fault movement and/or compaction in the formation. The present invention thus, may be applied to any substantially cylindrical object in a well bore for purposes of detecting and monitoring deformation of the object during production or other non-production operations such as, for example, completion (e.g., gravel packing/frac packing), production and stimulation operations.

Accordingly, the cylindrical object may be provided in the form of a wellbore tubular, such as for instance a drill pipe, a production tube, a casing tube, a tubular screen, a sand screen.

In particular when employed on a casing tube or a production tube, the methods described above may be used in a method of producing a mineral hydrocarbon fluid from an earth formation, comprising:

applying the string of interconnected strain sensors to the cylindrical object in the form of a casing tube, a production tube, or a screen;

inserting the cylindrical object into a wellbore in the earth formation;

producing the mineral hydrocarbon fluid through the cylindrical object.

The strain and bending condition of the cylindrical object can thus be monitored during production, such that preventive and/or remedial action may be taken to maximize the production efficiency in under the given circumstances.

The present invention could also be used in any other situation where pipes expand and contract, or bend, such as, for example, refineries, gas plants, and pipelines. The present invention may also be useful for imaging deformation (shape/magnitude/movement) of other, non-cylindrical, objects and thus, could be used for displacement sensing using the same principles applied to different length scales. The present invention may also be used to obtain data for other types of geomechanical modeling, including, for example dams or other objects. It is therefore, contemplated that various situations, alterations and/or modifications may be made to the disclosed embodiments without departing from the spirit and scope of the invention as defined by the appended claims and equivalents thereof.

We claim:

1. A method of applying a string of interconnected strain sensors to a cylindrical object for monitoring deformation of the object, comprising:
    selecting a preferred first wrap angle range between 0 and 90°;
    selecting a preferred second wrap angle range between 90° and 180°;
    applying the string of interconnected strain sensors in a selected zig-zag pattern comprising first and second application lines, the first application line essentially following a curvature of the cylindrical object along a preferred first wrap angle within the preferred first wrap angle range, the second application line essentially following a curvature of the cylindrical object along a preferred second wrap angle within the preferred second wrap angle range, whereby a first portion of the strain sensors is applied along the first application line and a second portion of the strain sensors is applied along the second application line.

2. The method of claim 1, further comprising:
    determining a strain factor for at least one wrap angle within at least one of the preferred first and second wrap angle ranges;
    determining one of the preferred first and second wrap angles within the at least one of the preferred wrap angle ranges, based on at least one determined strain factor.

3. The method of claim 2, wherein the step of determining the strain factor is based on a predetermined Poisson ratio for the object and a predetermined strain for the object.

4. The method of claim 3, wherein the predetermined Poisson ratio is between about 0.3 and about 0.5.

5. The method of claim 2, further comprising the step of selecting the determined strain factor based on a maximum sensor strain.

6. The method of claim 1, wherein the second preferred wrap angle equals 180° minus the first preferred wrap angle.

7. The method of claim 1, wherein the string of interconnected strain sensors comprises an optical fiber.

8. The method of claim 7, wherein the optical fiber makes a loop over a loop angle of more than 180° between the first portion of the strain sensors and the second portion of the strain sensors.

9. The method of claim 8, wherein the loop angle equals 180° plus the included angle between the first application line and the second application line.

10. The method of claim 8, wherein the loop is strain-isolated from the cylindrical object and comprises a third portion of the strain sensors.

11. The method of claim 8, wherein the loop is protected by a protective cover.

12. The method of claim 1, wherein the string of strain sensors is applied to the object in at least one of a protective sheath and a protective sheet.

13. The method of claim 1, wherein applying string of strain sensors in the selected zig-zag pattern comprises mechanically coupling the string of strain sensors to a pliable support structure in the selected zig-zag pattern and draping the pliable support structure around the object.

14. The method of claim 13, wherein the pliable support structure is selected from a group comprising a cloth, a blanket, a sheet, a fabric.

15. The method of claim 13, wherein the pliable support structure comprises at least two shell parts connected via pivoting hinges.

16. The method of claim 13, wherein the pliable support structure comprises at least two shell parts connectable via a latching mechanism.

17. The method of claim 1, wherein the object comprises a screen assembly.

18. A pliable support structure to which a string of interconnected strain sensors is mechanically coupled in a selected zig-zag pattern, which pliable support structure is capable of being draped around a cylindrical object, wherein the pliable support structure comprises at least two shell parts connected via pivoting hinges.

19. A pliable support structure to which a string of interconnected strain sensors is mechanically coupled in a selected zig-zag pattern, which pliable support structure is capable of being draped around a cylindrical object, wherein the selected zig-zag pattern comprises a first application line and a second application line, whereby a first portion of the strain sensors is mechanically coupled to the pliable support structure along the first application line and a second portion of the strain sensors is mechanically coupled to the pliable support structure along the second application line, whereby the first and second application lines extend in mutually differing directions defining an included angle between the first and second application lines of less than 180°.

20. The pliable support structure of claim 19, wherein the string of interconnected strain sensors comprises an optical fiber.

21. The pliable support structure of claim 20, wherein the optical fiber makes a loop over a loop angle of more than 180° between the first portion of the strain sensors and the second portion of the strain sensors.

22. The pliable support structure of claim 21, wherein the loop angle equals 180° plus the included angle between the first application line and the second application line.

23. The pliable support structure of claim 21, wherein the loop is strain-isolated from the pliable support structure and comprises a third portion of the plurality of sensors.

24. The pliable support structure of claim 21, wherein the loop is protected by a protective cover.

25. A method of imaging deformation of an object comprising the steps of:
   selecting a preferred first wrap angle range between 0 and 90°;
   selecting a preferred second wrap angle range between 90 and 180°;
   applying a plurality of sensors in a selected zig-zag pattern comprising first and second application lines, the first application line essentially following a curvature of the cylindrical object along a preferred first wrap angle within the preferred first wrap angle range, the second application line essentially following a curvature of the cylindrical object along a preferred second wrap angle within the preferred second wrap angle range, whereby a first portion of the plurality of sensors is applied along the first application line and a second portion of the plurality of sensors is applied along the second application line;
   detecting deformation of the object at each sensor; and
   imaging the deformation detected at each sensor on a projection device.

26. The method of claim 25, wherein the plurality of sensors are connected by an optical fiber.

27. The method of claim 25, wherein applying the plurality of sensors in the selected zig-zag pattern comprises mechanically coupling the plurality of sensors to a pliable support structure in the selected zig-zag pattern and draping the pliable support structure around the object.

28. The method of claim 27, wherein the pliable support structure is selected from a group comprising a cloth, a blanket, a sheet, a fabric.

29. The method of claim 27, wherein the pliable support structure comprises at least two shell parts connected via pivoting hinges.

30. The method of claim 27, wherein the pliable support structure comprises at least two shell parts connectable via a latching mechanism.

31. The method of claim 25, wherein the deformation image is displayed as a wavelength response at each sensor and a corresponding sensor number.

32. The method of claim 31, further comprising the steps of:
   monitoring the wavelength response; and
   detecting variations in the wavelength response at each sensor.

33. The method of claim 32, wherein the variations in the wavelength response are detected by variations in an amplitude for the wavelength response at each sensor.

* * * * *